US006973656B1

(12) United States Patent  
Huynh et al.

(10) Patent No.: US 6,973,656 B1
(45) Date of Patent: Dec. 6, 2005

(54) METHOD AND APPARATUS FOR LINKING DATA IN A DISTRIBUTED DATA PROCESSING SYSTEM

(75) Inventors: Tien Huynh, Yorktown Heights, NY (US); Robert Evan Strom, Ridgefield, CT (US); Michal Z. Ukelson, Hartsdale, NY (US); Daniel M. Yellin, Suffern, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/515,778

(22) Filed: Aug. 16, 1995

(51) Int. Cl.[7] .................................................. G06F 9/44
(52) U.S. Cl. ................................. 719/315; 719/332
(58) Field of Search ................... 395/683; 709/315, 709/316, 107, 108; 719/315, 316, 332, 331, 719/310; 718/107, 108; 717/165, 164, 162; 715/500

(56) References Cited

U.S. PATENT DOCUMENTS

| | | | | |
|---|---|---|---|---|
| 5,175,848 A | * | 12/1992 | Dysart et al. | 707/103 R |
| 5,185,885 A | * | 2/1993 | Dysart et al. | 707/100 |
| 5,303,379 A | * | 4/1994 | Khoyi et al. | 717/166 |
| 5,404,525 A | * | 4/1995 | Endicott et al. | 395/700 |
| 5,446,842 A | | 8/1995 | Schaeffer et al. | 395/200 |
| 5,608,909 A | * | 3/1997 | Atkinson et al. | 395/703 |
| 5,664,186 A | * | 9/1997 | Bennett et al. | 395/620 |
| 5,758,351 A | * | 5/1998 | Gibson et al. | 707/104.1 |
| 5,802,367 A | * | 9/1998 | Held et al. | 395/685 |
| 5,896,533 A | * | 4/1999 | Ramos et al. | 709/217 |
| 5,913,033 A | * | 6/1999 | Grout | 709/219 |
| 6,104,963 A | * | 8/2000 | Cebasek et al. | 700/86 |
| 6,223,344 B1 | * | 4/2001 | Gerard et al. | 717/11 |

OTHER PUBLICATIONS

"A Close-Up of OpenDoc", K. Piersol, BYTE, Mar. 1994, McGraw-Hill, Inc., N.Y,N.Y.

* cited by examiner

Primary Examiner—Sue Lao
(74) Attorney, Agent, or Firm—Michael J. Buchenhorner; Casey P. August

(57) ABSTRACT

An apparatus for implementing "links" between objects or content items in applications or documents in a distributed system such that changes to the source objects or items are reflected in changes to the target objects or content items. The apparatus includes mechanisms for allowing users to establish links, to break individual links, to copy documents or content including links, and to determine locations and/or descriptions of the source of a given target or any or all of the multiple targets of a given source.

Advantageously, the apparatus of this invention uses remote message passing for communication, thereby permitting links to be established even when the source and target applications execute on different platforms and even when they share no common file system.

The apparatus includes an availability server which can serve as a surrogate for applications which are currently not running. This permits targets of links to query the state of a link source, to register/unregister with the link source in order to receive notification of updates, create new links linked to the same link source, and to break their link to the link source, even though the application containing the link source is unavailable.

The apparatus of the availability server can be generalized to support the ability to support transparent access from one application to objects of a second application in the face of unavailability of the second application.

15 Claims, 18 Drawing Sheets

METHOD AND APPARATUS FOR LINKING DATA IN A DISTRIBUTED DATA PROCESSING SYSTEM

BACKGROUND OF THE INVENTION

1. Technical Field

This invention relates generally to a distributed data processing system and, more particularly, to the linking of data in a distributed data processing system.

2. Description of the Related Art

Linking is technology that has roots in various PC technologies, most notably Dynamic Data Exchange (DDE). In its current form, it is best known in Microsoft's OLE (Object Linking and Embedding) system. In short, it allows an end-user to select some portion of a document A, commonly called the source document, and link it to another document B, commonly called the target document. This can be done by either copying the selected portion of document A to the clipboard and then pasting it AS A LINK to document B, or dragging and dropping the selected content from A to B, specifying that this drag and drop should be treated AS A LINK. After this is done, the target document B will display the same content copied from the source document A. Additionally, whenever the end-user modifies the linked portion of the source document A, the changes to the linked portion will be updated in the target document B.

The current implementations of linking assume that both the source of the link and the target of the link are part of a shared file system. The shared file system is the way that the information is communicated between the source document and the target document (at least when the source document is not open, and in some implementations when it is open as well). This means that if the two documents are not part of a shared file system, the link cannot be established and/or maintained. For instance, if a document at location X is linked to some other document at location X, and then one of the documents is transferred to a system at location Y (for example, by e-mail), the link would not be maintained unless the new location Y was part of the same shared file system as the location X. Moreover, if a link is to be established over a network, the current implementations require that the linked documents shared the same file system. Hence, the current implementations cannot be used to provide links over the Internet, for instance.

Moreover, because the current implementations require that the source and target documents share the same file system, such links can only be established/maintained between documents that reside on the same operating system platform. For example, one cannot establish/maintain links between one or more documents created under the Microsoft's Windows operating system platform and one or more documents created under IBM's OS/2 operating system platform, or between one or more documents created under the Apple's System 7 operating system platform and one or more documents created under Microsoft's Windows operating system platform.

In addition, in most linking implementations, the link targets usually track the source of each link. Hence the end-user can request the target document to describe the source of a particular link. However, this is not true for source documents; thus an end-user cannot find out which target documents are linked to a particular link source. Similarly the end-user cannot request to selectively break a particular link target.

Furthermore, in some implementations, the target document is not updated in certain instances. For example, consider the following scenario. First, a target document is opened and registers with a source document, requesting a link with the source document. Both the source and target documents are then closed. Subsequently, the target document is opened. Sometime later, the source document is opened and the linked content updated. In some implementations the target document may not be notified of the change. In a separate example, consider the following. A source document and a target document are opened. The target document registers with the source document, requesting to be notified when the link content changes. The source document is then closed without saving. Subsequently, the source document is reopened and the linked content of the source document updated. Again, in some implementations, the target document may not be notified of the change.

SUMMARY OF THE INVENTION

The above-stated problems and related problems of the prior art are solved with the principles of the present invention, method and apparatus for communicating information in a distributed data processing system. The system uses a standard messaging protocol for objects and processes to communicate, thereby alleviating the need for a shared file system. The system includes a first application and an object in a second application. The second application may be in one of an executing state and a non-executing state. The object may be in one of a loaded state and an unloaded state. The apparatus of the present invention includes an availability server that, in response to a message-intended for the object that is sent from the first application to the availability server, when the second application is in the non-executing state and a surrogate object associated with the object is in a non-loaded state, loads and initializes the surrogate object, and forwards the message to the surrogate object. The surrogate object, upon receiving the message from said availability server, processes the message and responds to the first application accordingly.

Advantageously, the availability server of the present invention provides the first application with access to the object within the second application, regardless of whether the second application is executing or not and regardless of whether the object is loaded or unloaded, such that the first application can communicate with the object, for example, to read information stored in the object or to change the state of the object. The availability server also provides a mechanism for storing auxiliary data associated with the object that may be updated by the first application when the second application is not executing.

In another aspect of the present invention, a tracking mechanism is provided that identifies the sources and targets of each link, thus providing end-users with the ability to break existing links and/or providing end-users with information about the link sources and link targets in a particular document and/or in a particular part of a document.

BRIEF DESCRIPTION OF THE DRAWINGS

FIG. 11 (steps 5 and 6) represents operation of the target part and LinkTarget object in forwarding messages from the LinkTarget object to the LinkSource object (or a LinkSourceSurrogate object) via the Availability Server according to the present invention;

DETAILED DESCRIPTION OF THE PRESENT INVENTION

A distributed data processing system includes at least two computer systems and means for communicating data between the two computer systems. Distributed data processing systems can be local area networks (LANs), which provide direct communication among the computer systems on the user's local premises, or wide area networks (WANS), which provide communication services to a geographic area larger than that served by a LAN. Typically, WANs operate at a slower speed than LANs. Moreover, at the physical level, distributed data processing systems can run over various network interfaces, such as Token Ring, Ethernet, PC Network, Fiber Distribution Data Interface (FDDI), X.25, and Integrated Services Digital Network (ISDN).

Figure 1:
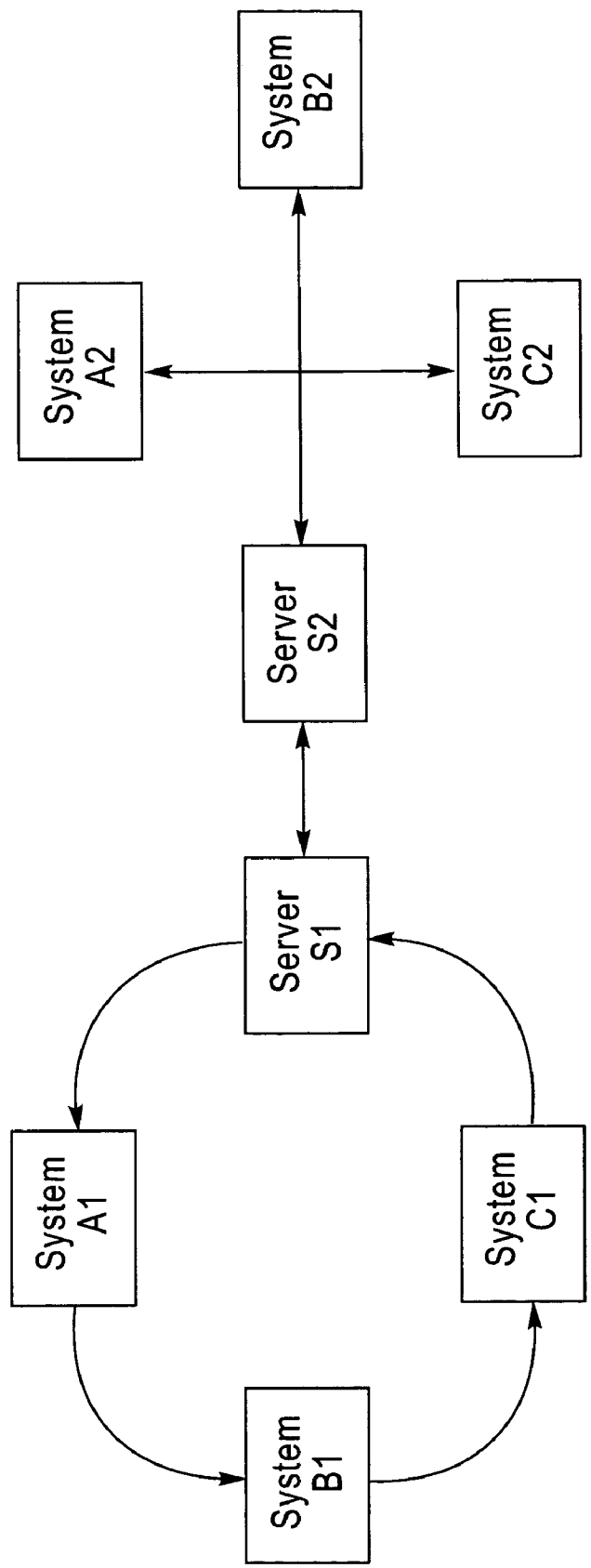
FIG. 1 is a pictorial representation of distributed data communication system.

An example of a distributed data processing system is shown in FIG. 1, wherein three computer systems A1,B1, and C1 are networked to a server system S1 in a token-ring configuration. The physical communication links between the computer systems A1, B1, C1 and between the computer systems A1,C1 and the server S1 may be a T1 link, a telephone line, a fiber optic link or other suitable means. In addition, the system includes three computer systems A2,B2,C2 that are networked to a server system S2 in a star configuration. The physical communication links between the computer systems A2,B2,C2 and the server S2 may be a T1 link, a telephone line, a fiber optic link or other suitable means. In addition, the server S1 communicates with the server S2 over a communication link. The communication link may be a T1 link, a telephone line, a fiber-optic link, a microwave link, an Internet connection, or other suitable means for communicating data between the servers S1 and S2. The servers S1 and S2 are typically more robust in terms of processing power, data storage capacity, and memory than the associated computer systems, and may be used to share application software and data among the computer systems. Moreover, the servers S1 and S2 typically provide security to control access to the associated computer systems.

In a distributed processing system, the computer systems communicate data with one another via a communication protocol. Some of the common communication protocols used today include Open Systems Interconnect (OSI), Transmission Control Protocol/Internet Protocol (TCP/IP) and System Network Protocol (SNA). When utilizing TCP/IP for example, the computer systems communicate packets of data to one another over communication links as described above. Each packet includes a source identifier that identifies the source of the data and a target identifier that identifies the target of the data. For example, if the computer system B1 is to send one or more data packets to computer system C2, each data packet includes a source identifier that identifies the source of the data as computer system B1 and a target identifier that identifies the target of the data as computer system C2. The data packets are routed throughout the system according to the target identifier. Upon receiving the data packet, the target system, in this case C2, typically sends a reply to the source utilizing the source identifier encoded in the received data packet. The reply includes a source identifier that identifies the source of the data as computer system C2 and a target identifier that identifies the target of the data as computer system B1. The reply is routed throughout the system according to the target identifier. A more detailed description of TCP/IP may be found in D. Corner, "Internetworking with TCP/IP: principles, protocols, and architecture", Prentice-Hall, 1988, herein incorporated by reference in its entirety. A more detailed description of OSI may be found in Marchall T. Rose, "The Open Book: A Practical Perspective on OSI", Prentice-Hall, 1990, herein incorporated by reference in its entirety. And a more detailed description of SNA may be found in James Martin, "SNA: IBM's Networking Solution", Prentice-Hall, 1987, herein incorporated by reference in its entirety.

The software that programs the computer systems to communicate with one another preferably is designed and implemented as a set of smaller pieces. One technique to decompose the software into the set of smaller pieces that has gained substantial popularity is the object-oriented programming technique wherein the software is partitioned into a set of logical objects that interact with one another to achieve the required system functionality. Each logical object is self-contained and provides a well-defined interface that permits the orderly interaction between the object and any other objects in the system. A programming language that supports the object-oriented programming techniques is C++. A more detailed description of the C++ language may be found in Stanley B. Lippman, "C++ Primer", Addison- Wesley, 1991 (2nd Edition) and in M. A. Ellis et al., "The Annotated C++ Reference Manual", Addison-Wesley, 1990, herein incorporated by reference in their entirety. Environments suitable for programming in C++ include for example IBM's Visual Age C++ and Microsoft's Visual C++. These environments typically are designed to build software that is compatible with a specific operating system platform, such as IBM's OS/2, Microsoft's Windows, or a UNIX-based operating system platform such as Microsoft's Windows NT.

In addition, to alleviate the complexity of object-oriented programming in distributed environments, computer scientists have designed architectures that make the distribution of the objects of system transparent to the programmer. Such an architecture provides the programmer with the capability of making location-transparent distributed method calls, meaning that an object reference can be either to a local object in the source process, or to a remote object in another process. An example of such an object architecture is the Common Object Request Broker Architecture (CORBA), described in detail in "The Common Object Request Broker: Architecture and Specification", by Digital Equipment Corp. et. al, OMG Document No. 91.12.1, Rev. 1.1, 1992, herein incorporated by reference in its entirety. An implementation of such an object architecture is available in IBM's System Object Model (SOM), which complies with the specifications of the CORBA architecture. Support for SOM is included in IBM's Visual Age C++ product. A description of SOM may be found in "SOMobjects Developer Toolkit User's Guide", Version 2.1, October 1994.

Figure 2A:
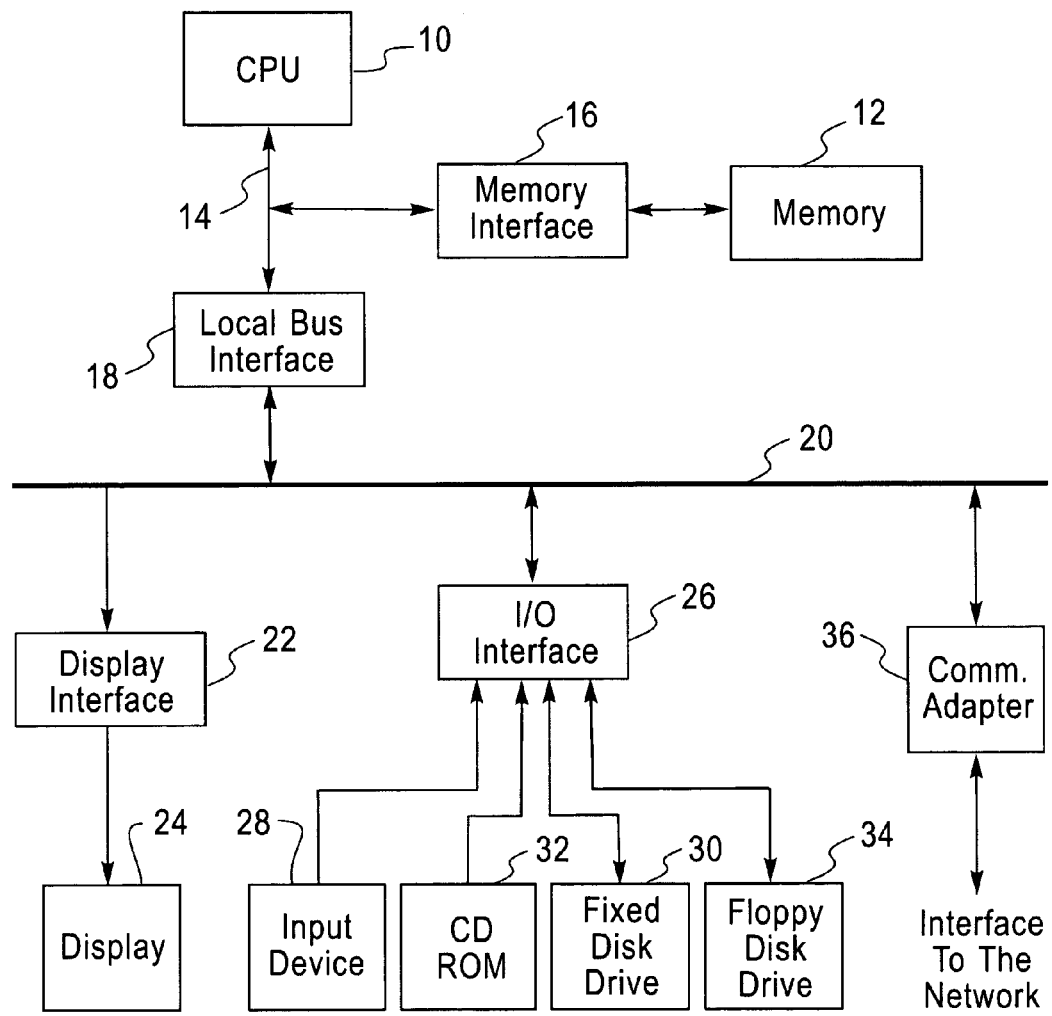
FIG. 2(A) is a functional block diagram of a computer processing system of FIG. 1.

A conventional computer system as shown in FIG. 2(A) embodies the present invention. The computer system includes a processor 10 coupled to memory 12 via a high-speed processor bus 14 and memory interface 16. The memory 212 may include system dynamic memory, cache memory, and/or non-volatile memory. The memory interface 16 performs functions such as address decoding and bus control such that the processor 10 can read instructions and data from the memory 12 and write data to the memory 12. The memory interface 16 may also perform functions such as dynamic memory refresh. A local bus interface 18 bridges the processor bus 14 to a second bus 20. The local bus interface 18 converts data transmitted over the processor bus 14 to the format of the second bus 20 and converts data transmitted over the second bus 20 to the format of the processor bus 14.

In addition, the computer system includes a display interface 22 for driving a display 24. The display interface 22 typically includes a graphics controller and associated memory. The computer system also includes an I/O interface 26 that provides an interface to one or more data storage devices and an input device 28 such as a keyboard or a pointing device. The data storage devices may include a fixed hard disk drive 30, a CD-ROM drive 32, a floppy drive 34, a tape back-up drive (not shown), an optical drive (not shown), or other suitable devices.

The computer system also includes a communication adapter 36 that provides a physical interface to the network. The communication adapter 36 can implement various network interfaces such as Token Ring, Ethernet, PC Network, Fiber Distribution Data Interface (FDDI), X.25, and Integrated Services Digital Network (ISDN).

Figure 2B:
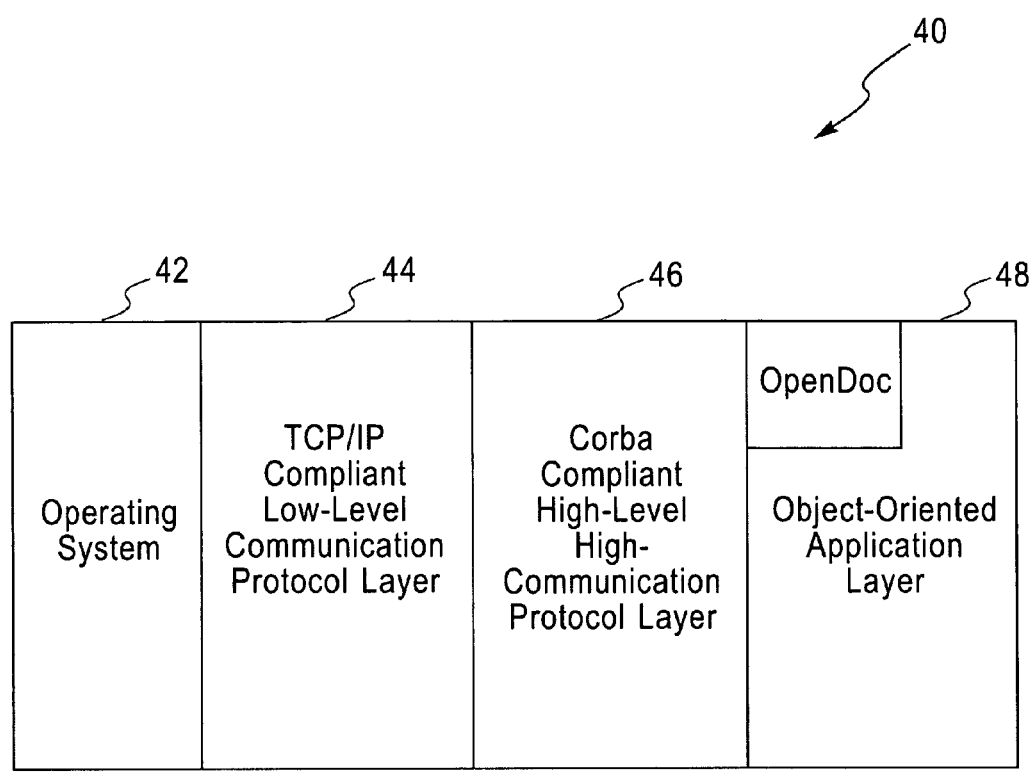
FIG. 2(B) is a pictorial representation of the layers of software that may be executed on the computer processing system of FIG. 2.

As shown in FIG. 2(B), the software 40 that controls each of the computer systems in a distributed system to communicate with one another preferably includes an operating system layer 42, a low-level communication protocol layer 44, a high-level object communication protocol layer 46, and an object-oriented-application layer 48. Each of the layers 42,44,46,48 can be stored on one or more floppy disks or CD-ROMs and transferred to the fixed disk drive via the floppy disk drive 34 or CD-ROM drive 32, respectively. Moreover, two or more of the layers 42,44,46,48 may be integrated into a common software package that is stored on one or more floppy disks or CD-ROMS. In this case, the software package is transferred to the disk drive via the floppy disk drive 34 or CD-ROM drive 32, respectively. The software 40 is preferably read from the fixed disk drive 30 (in the alternative, from the CD-ROM drive 32 or from the floppy disk drive 34) into memory for execution by the processor 10.

The operating system layer 42, when executed by the processor 10, provides a direct interface to the hardware devices of the computer system, and more specifically to the communication adapter 36, thus managing the flow of data between the computer system and other computer systems and providing for user interaction. The object-oriented-application layer 48 includes a plurality of objects that, when executed by the processor 10, send and receive data from other objects or applications (which may be executing on a remote computer processing system). The high-level object communication protocol layer 46, for example IBM's SOM, and the low-level communication protocol layer 44, for example a TCP/IP layer such as IBM's TCP/IP version 2.0, formats the data to be sent from one object to another object and routes the data over the network guaranteeing that the data is properly delivered to the appropriate object and that the correct method of that object is invoked.

To illustrate the functions performed by the various layers of the software 40 in a distributed environment, consider the operation of two remote computer systems A and B when data generated by a client object that is part of an object-oriented-application layer 48 executing on computer system A is sent to a server object which is part of an object-oriented-application layer 48 that is executing on a computer system B. First, the high-level object communication protocol layer 46 executing on computer system A determines the location of the server object, and then sends a message to the low-level communication protocol layer 44 to send the data generated by the client object to the server object. The high-level object communication protocol layer 46 marshals the data into a transmission format that identifies the object that is to receive the data and that identifies the method to be invoked by the object to receive the data. The low-level communication layer protocol layer further formats the data such that is complies with a standard protocol, for example TCP/IP, and delivers the formatted data to the communication adapter 36 of the computer system A. The communication adapter 36 of the computer system A then transfers the formatted data to the communication adapter 36 of the computer system B over the network. This transfer may be direct, or indirect via intermediate nodes within the network.

Upon receipt, the communication adapter 36 of the computer system B delivers the received data to the low-level communication protocol layer 44 of the computer system B. The low-level communication protocol layer 44 executing on computer system B reformats the received data by stripping away, for instance, any routing information and delivers the reformatted data to the high-level object communication protocol layer 46 executing on computer system B. The high-level object communication protocol layer 46 de-marshalls the data and determines which object and which object method executing on computer system B is the intended recipient of the data, and reformats the data into a format expected by that object. The high level object communication protocol layer 46 then invokes the appropriate method, passing it the reformatted data. This mechanism can also be used to implement a peer-to-peer environment by making each application operate independently as both as client and a server.

In addition, it has become apparent that objects work efficiently together when objects share a common interface architecture. Moreover, such a common interface architecture allows the objects to interact with one another independent of the operating system platform for which the objects were designed. OpenDoc, which is currently being developed by IBM, Apple and Wordperfect, is an example of such a common interface architecture. OpenDoc is an architectural framework for applications for preparing, editing, and viewing compound documents. In OpenDoc, a compound document consists of one or more parts. The parts may contain data as diverse as navigable movies, sounds, animation, and data bases information, as well as traditional spreadsheets, graphics, and text. In general, users manipulate and display the parts using application components called part editors, part viewers and services. A more detailed description of OpenDoc parts and features may be found in the "OpenDoc Programmer's Guide", Apple Computer Corp., Preliminary Draft, November 1994, and K. Piersol, "A Close-Up of OpenDoc", AIXpert, June 1994, available at http://www.austin.ibm.com/developer/aix/library/aixpert/june94/aixpert_june94_closeup.html, herein incorporated by reference in their entirety.

In a distributed environment, the OpenDoc framework may be viewed as a portion of the object-oriented application layer 48 that is executed on the computer systems as illustrated in FIG. 2(B). Importantly, the parts that make up the documents in OpenDoc are represented by objects within the object-oriented application layer 48. For simplicity, the present invention as described below is embodied as part of an OpenDoc application layer that includes one or more parts, wherein communication among the computer systems occurs between objects that comply with the CORBA standards mentioned above. Preferably, the objects of the present invention are created in a C++/CORBA environment, for example IBM's Visual Age C++(with SOM support). Moreover, the software controlling the computer systems of the present invention preferably include a CORBA compliant high-level object communication protocol layer 46, for example IBM's SOM, and a TCP/IP compliant low-level communication protocol layer 44, for example IBM's TCP/IP Version 2.0.

Each OpenDoc part contains content elements. Depending on the type of part and by the selections made by an end-user, the content elements may be characters, spreadsheet cells, drawing elements, etc., or aggregates, such as paragraphs, one or more rows of spreadsheet cells, figures, etc.

According to the present invention, a LinkSpec object, a LinkSource object, a LinkTarget object, a LinkService object and an Availability Server are used to link data between a source part and one or more target parts. Any part can potentially play the role of a source part and a target part, and contain both LinkSource objects and Linktarget objects. The source part and the target part may be components of an OpenDoc document executing on a single computer system, may be components of multiple OpenDoc documents executing on a single computer system, or may be components of multiple OpenDoc documents executing on separate computer systems.

Figure 3:
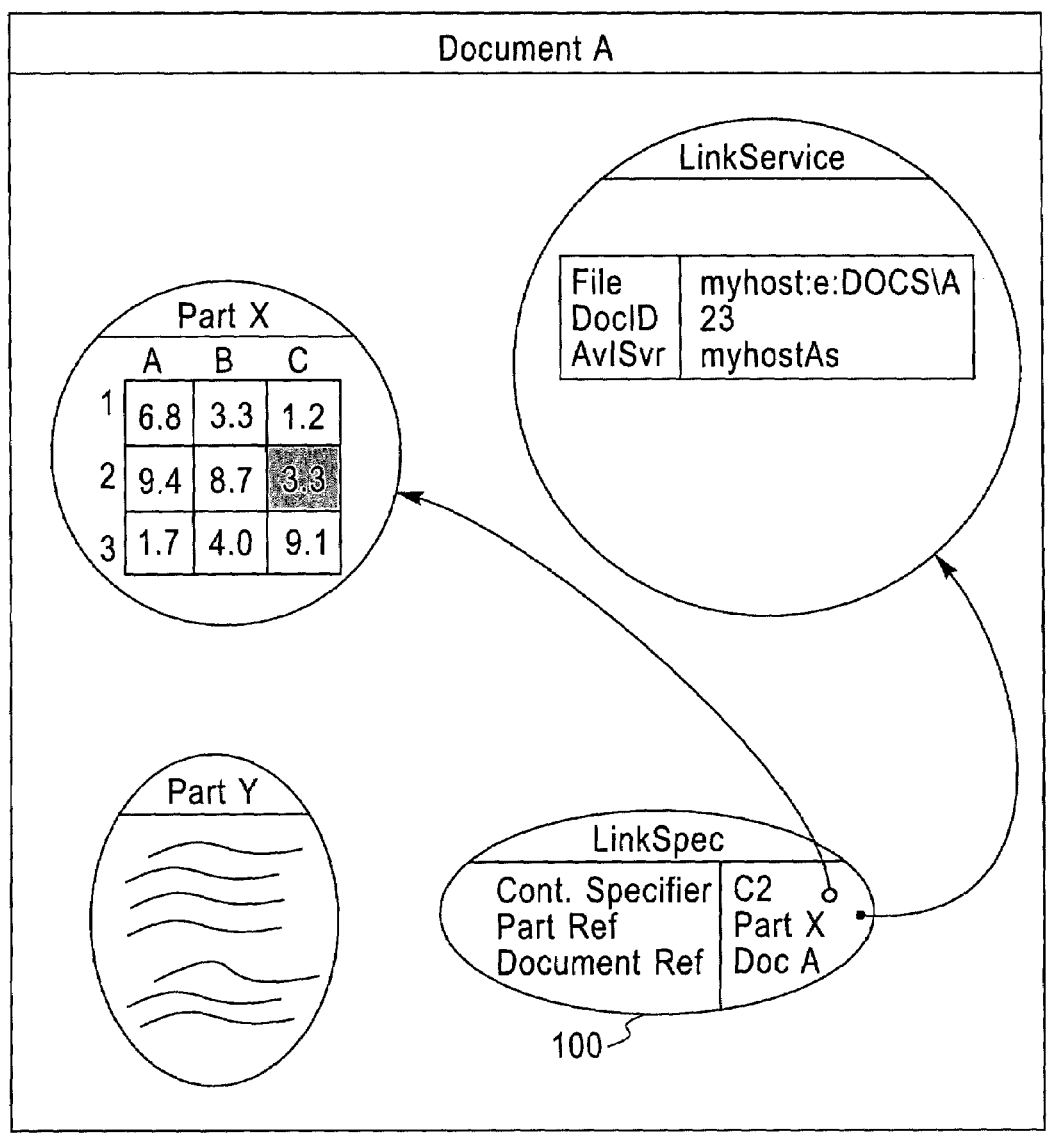
FIG. 3 is a pictorial representation of an OpenDoc document A including a part X, a part Y, a LinkSpec object, and a LinkService object according to the present invention.

The LinkSpec object is created by the source part. It represents the capability of establishing a link to some particular content element in the source part. The source part provides the Linkspec object with a content specifier that identifies the linked content element. The content specifier will be used later by the source part to locate the content element for which a link is requested. As illustrated in FIG. 3, the Linkspec object 100 contains:
   i) a pointer to the source part, labeled "Part Ref";
   ii) a pointer to the LinkService object associated with the source document, labeled "Document Ref"; and
   iii) the content specifier, labeled "Cont. Specifier".

Figure 4:
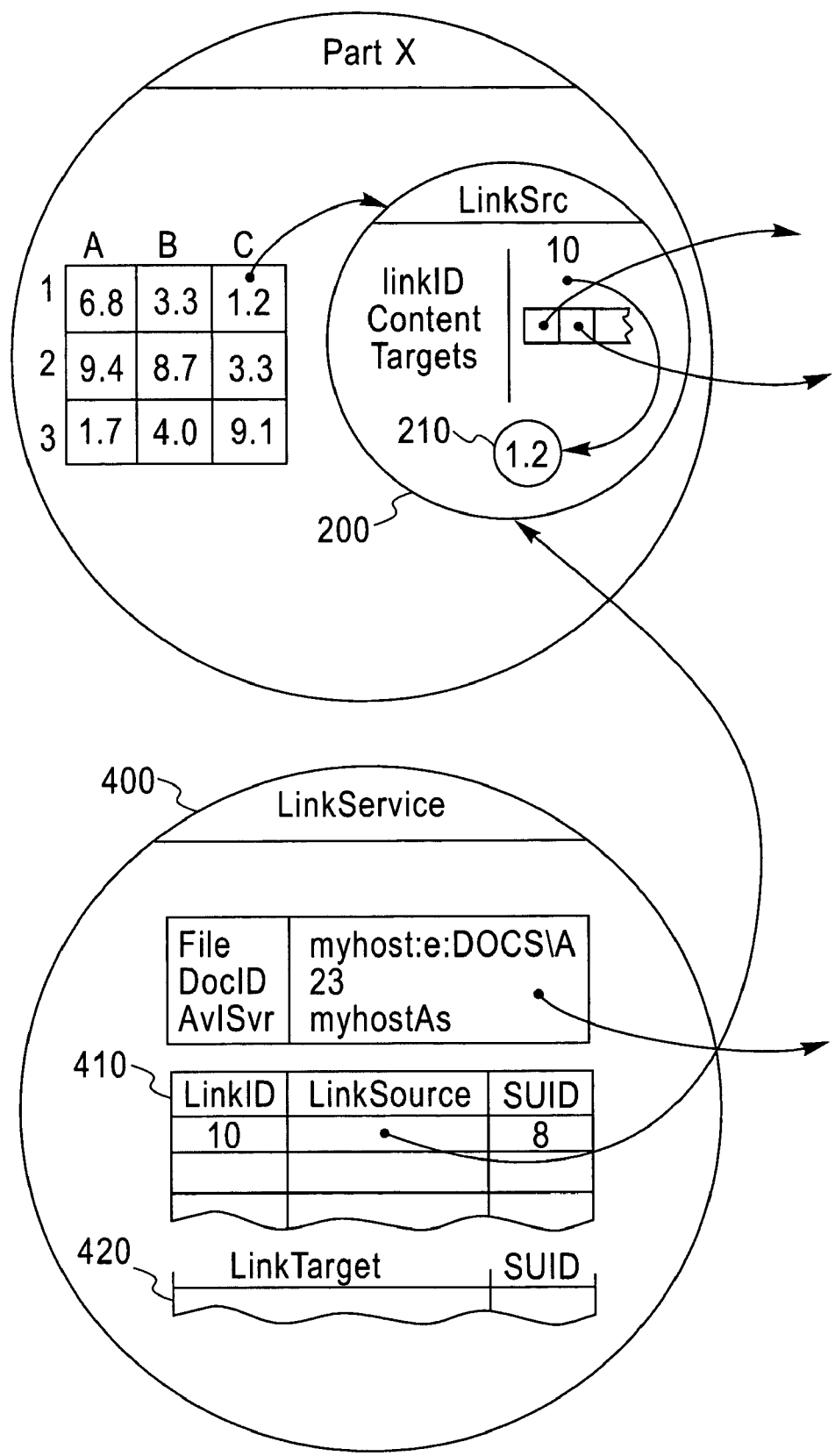
FIG. 4 is a pictorial representation of information stored by the LinkSource object and the LinkService object according to the present invention.

The LinkSource object is created by a source part when a target asks the source to create a link to the content element identified by a particular LinkSpec object. The LinkSource object resides in the source part. There is potentially more than one LinkSource object in the source part. As shown in FIG. 4, each LinkSource object 200 contains:
   (i) a Content object 210, which stores a copy of the content element being linked;
   (ii) a linkID unique to the particular LinkSource object;
   (iii) a pointer to the Content object 210;
   (iv) a table of targets including entries for each registered and tracked target; each entry corresponding to a registered target or an open tracked target includes a pointer to the LinkTarget object, a connection ID (as described below in more detail), and a description of the target; the description includes the host name and document file name of the target and information related to the target, for example, a description of how the target is using the linked content;
   (v) a changeID that uniquely identifies a particular version of the content object 210; and
   (vi) a description of the link content in the source document; the description includes the host name and document file name of the source document and information related to the source content.

Whenever the source part wants to update the linked content, the source part first asks the LinkSource object for a lock on the Content object. Once the source part obtains this lock, the source part then updates the Content object. Once the source part is done updating the Content object, the source part provides a new ChangeId to the LinkSource object, which then stores the ChangeID and frees the lock on Content object. The source part can break all links by destroying the LinkSource object. Individual links can also be broken as explained below.

The LinkTarget object is created when a target part requests a link to the content element specified by a particular LinkSpec object. The LinkTarget object resides in the target document. There is potentially more than one LinkTarget object in the target part. The target part can register with one or more LinkTarget objects. If it is registered, the target part will receive an update message whenever the content element of the particular link associated with a registered LinkTarget object is updated. This message will be generated after the source part has updated the Content object at the source of the link and released the lock on that object. A target part can ask the LinkTarget for the most recent ChangeId associated with this link, and can request a lock on the Content object. If it obtains the lock, it can read the content element of the link. When it is finished reading the content element, it must release the lock. If it is registered, the target part can ask to unregister.

Figure 10:
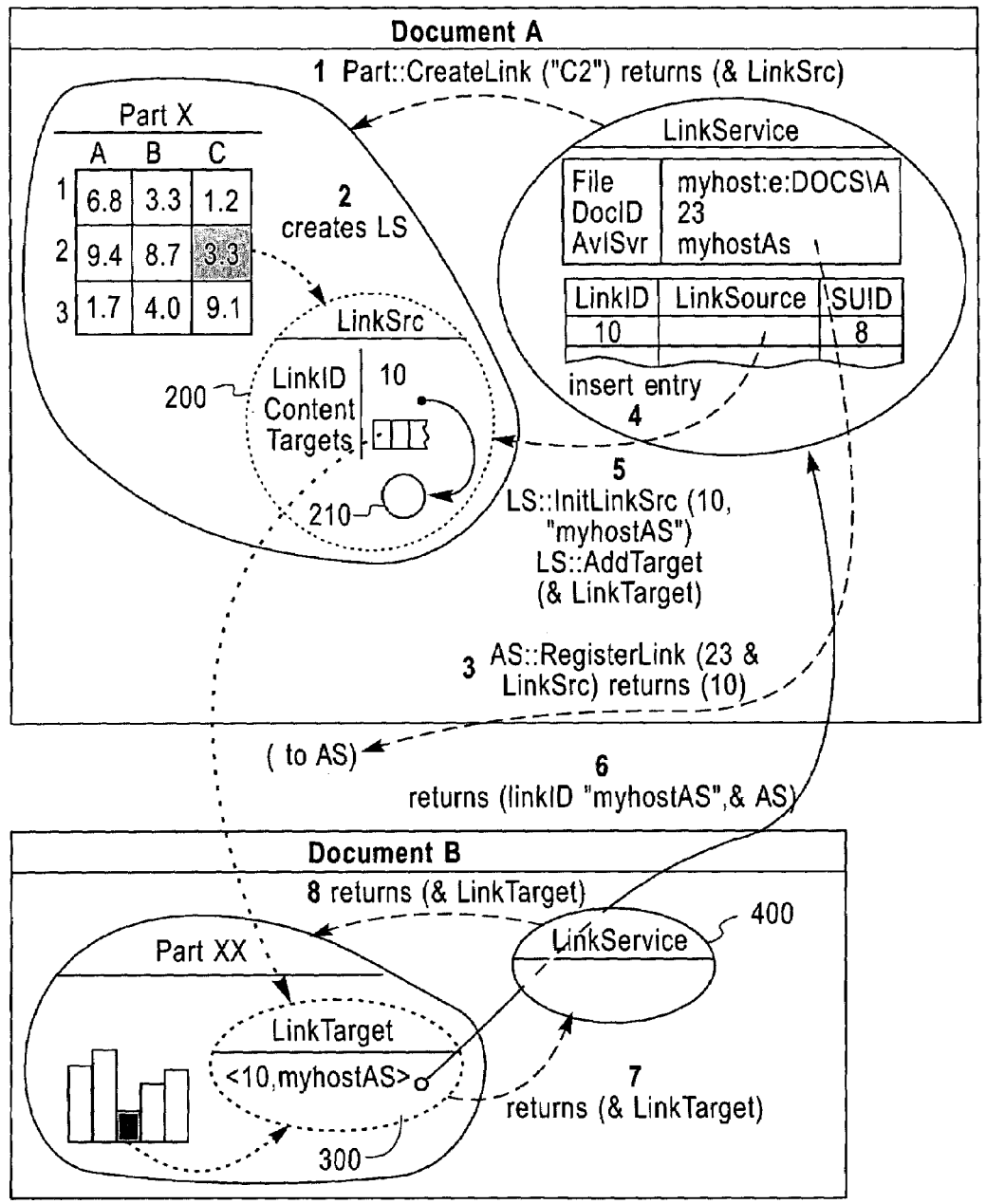
FIG. 10 is a pictorial representation of the operation of the source part in creating a LinkSource object, registering the newly created LinkSource object with the Availability Server, and returning the relevant information to the target part.

As shown in FIG. 10, the Linktarget object 300 contains:
   i) the name of the Availability Server serving the LinkSource object, for example myhostAS as shown; and
   ii) the LinkID, for example 10 as shown;

iii) a description of the target part (not shown); the description includes the host name and document file name of the target and information related to the target.

The name of the Availability Server can be used to locate the Availability Server with a CORBA compliant naming service. The located Availability Server and the LinkID can be used to locate and access the LinkSource object whether the source document is open or not.

The LinkService object is used to help establish links across documents, and to keep track of the LinkSource objects and LinkTarget objects within a document. There is one LinkService object for each document. As shown in FIG. 4, the information retained in the LinkService object 400 includes:

i) the file location of the document, for example "myhost: e:DOCS\A" as shown;
ii) the DocumentId (obtained from the Availability Server when the document was created as discussed below), for example 23 as shown;
iii) the name of the Availability Server this document is registered with, for example "myhostAS" as shown; the LinkService object 400 and LinkTarget object 300 can use this name to locate the Availability Server using a naming service such as described in the SOMobjects Developer Toolkit User's Guide, Version 2.1, October 1994, incorporated by reference above; and
iv) a table of LinkSource objects 410 contained within the document including, for each LinkSource object, a LinkID, a pointer to the LinkSource object (if it is open), a storage unit identifier that identifies where the external representation of the LinkSource object can be found; the information in the table of LinkSource objects 410 preferably also includes an externalized reference to the part in which each particular LinkSource object resides; and
v) a table of Linktarget objects 420 contained within the document including, for each LinkTarget object, a pointer to the LinkTarget object (if it is open), a storage unit identifier that identifies where the external representation of the LinkTarget object can be found; the information in the table of LinkTarget objects 420 preferably also includes an externalized reference to the part in which each particular LinkTarget object resides.

The Availability Server is used to provide access to the LinkSource object 200, and the content element therein, when the document in which the LinkSource object 200 resides is not open. The Availability Server does this by creating a LinkSourceSurrogate object that is initialized from the persistent state of the LinkSource object that resides in the document, and from the auxiliary state of the LinkSource object that resides in the Availability Server. Preferably, there is one Availability Server per machine running OpenDoc. Thus, file sharing across the network is not necessary for the Availability Server to read this persistent state. Usually a LinkSourceSurrogate will only exist if a document in which the LinkSource resides is closed. However a LinkSource object in the document and a LinkSourceSurrogate in the Availability Server may briefly coexist for the reasons described below.

Figure 5:
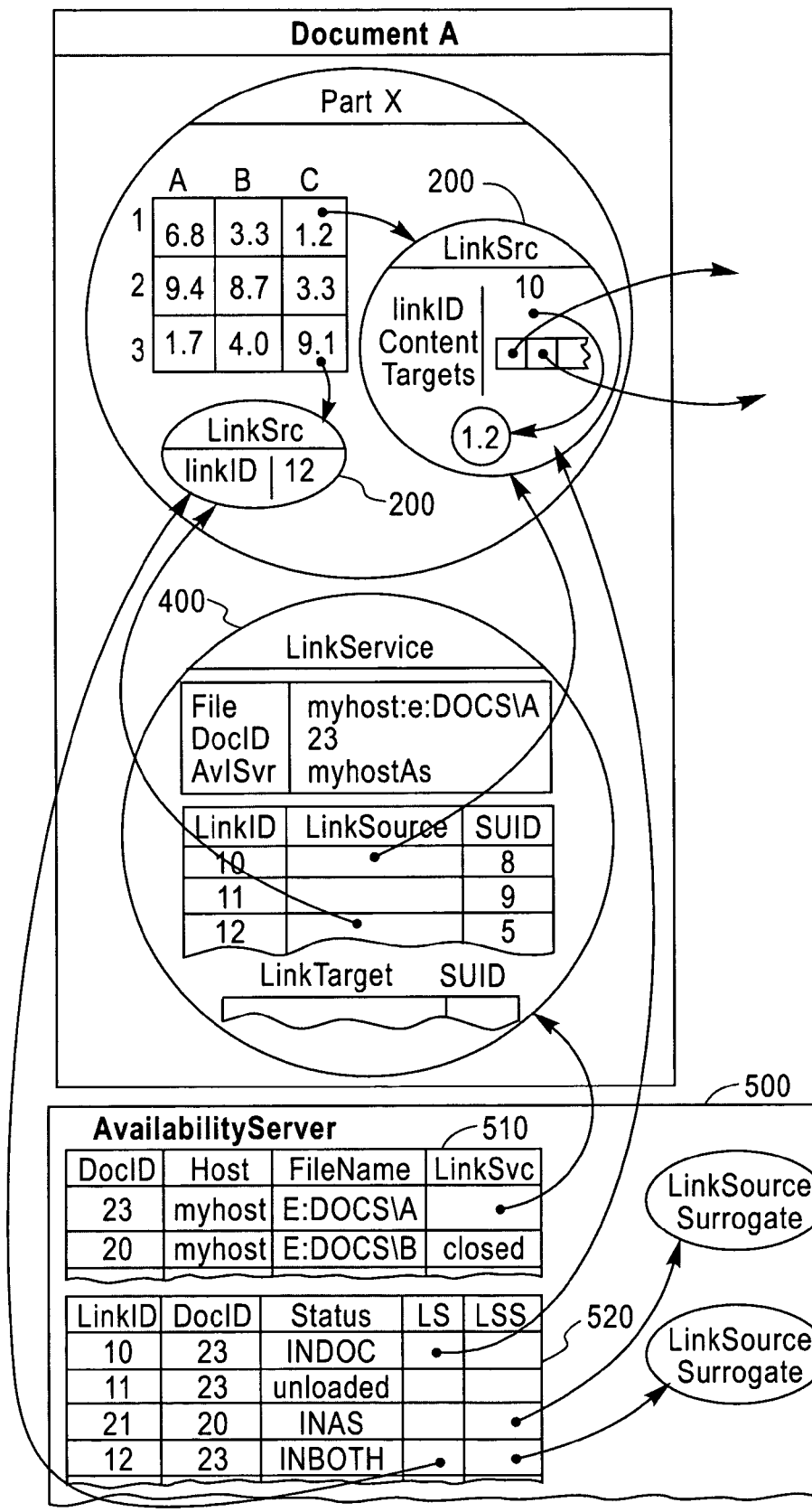
FIG. 5 is a pictorial representation of information stored by the Availability Server according to the present invention.

As shown in FIG. 5, the Availability Server maintains the following information:

i) a table of documents 510 registered with the Availability Server 500 including, for each document, the location of the document and the LinkIds of LinkSource objects in that document (not shown); preferably, the location of the document is specified by the host machine name and an absolute path name; additionally, if the document is currently open, the Availability Server maintains a pointer to the document's LinkService object;
ii) a table of LinkSource objects 520 registered with the Availability Server 500 including, for each LinkSource object, the DocumentId of the document in which this LinkSource object resides, the LinkID, the status of the LinkSource object, a pointer to the LinkSource object if the LinkSource object is currently open, a pointer to the LinkSourceSurrogate object associated with the LinkSource object if the LinkSourceSurrogate object is open, and a content lock flag (not shown) that indicates whether the Content object of the LinkSource object is locked or not; the status of the LinkSource object is preferably broken down into four categories: InDoc (meaning that the document is open and the link source object is also open), InAS (meaning that the document is closed, and a LinkSourceSurrogate for this link has been created in the Availability Server), InBoth (meaning that a LinkSource object for this link exists in the document and a LinkSourceSurrogate exists in the Availability Server), and Unloaded (meaning that neither a Linksource object nor the LinkSourceSurrogate object exist in the document).
iii) a table of auxiliary state (not shown) for each LinkSource object registered with the Availability Server; the auxiliary state lists all of the remote LinkTarget objects that are registered with or tracked by the LinkSource object; the auxiliary state of the LinkSource object represents that part of the state of the LinkSource object which can be changed even while the document is closed; the remaining state of the LinkSource object cannot be changed when the document is closed.

In addition, additional interfaces are provided by which the source part can:

(i) request that the LinkSource object provide a description pertaining to each target to which the LinkSource object is linked; each target description includes the host name and document name in which the target resides; each target description also preferably includes a description of the target part (supplied by the target part);
(ii) request that the LinkSource object disconnect a particular target from being linked to this content element (break a particular link, not all links); and
(iii) set the source part description; this description will be given to target parts of the link if they request information about the source part.

In addition, additional interfaces are provided by which the target part can:

(i) request that the source part provide a description of the source part; this description includes the host name and document name in which the source resides; this description also preferably includes a description of the source part; and
(ii) set the target part description; this description will be given to the source part if it requests information about this target part of the link.

Additionally, an interface can be provided wherein any part can request the LinkService object to:

(i) list all LinkSource objects and/or LinkTarget objects in the document; and
(ii) list all the LinkSource objects and/or LinkTarget objects in a particular part that resides in the document.

An OpenDoc document can be either open or closed. When a document is open, the parts of the document and the associated content element may be loaded into memory and the parts executed as one or more processes by the processor. When a document is closed the parts of the document are not executing and the content elements of the parts are stored in a file (the document file) in non-volatile memory, for example, on the hard disk drive associated with the computer system.

Figure 6:
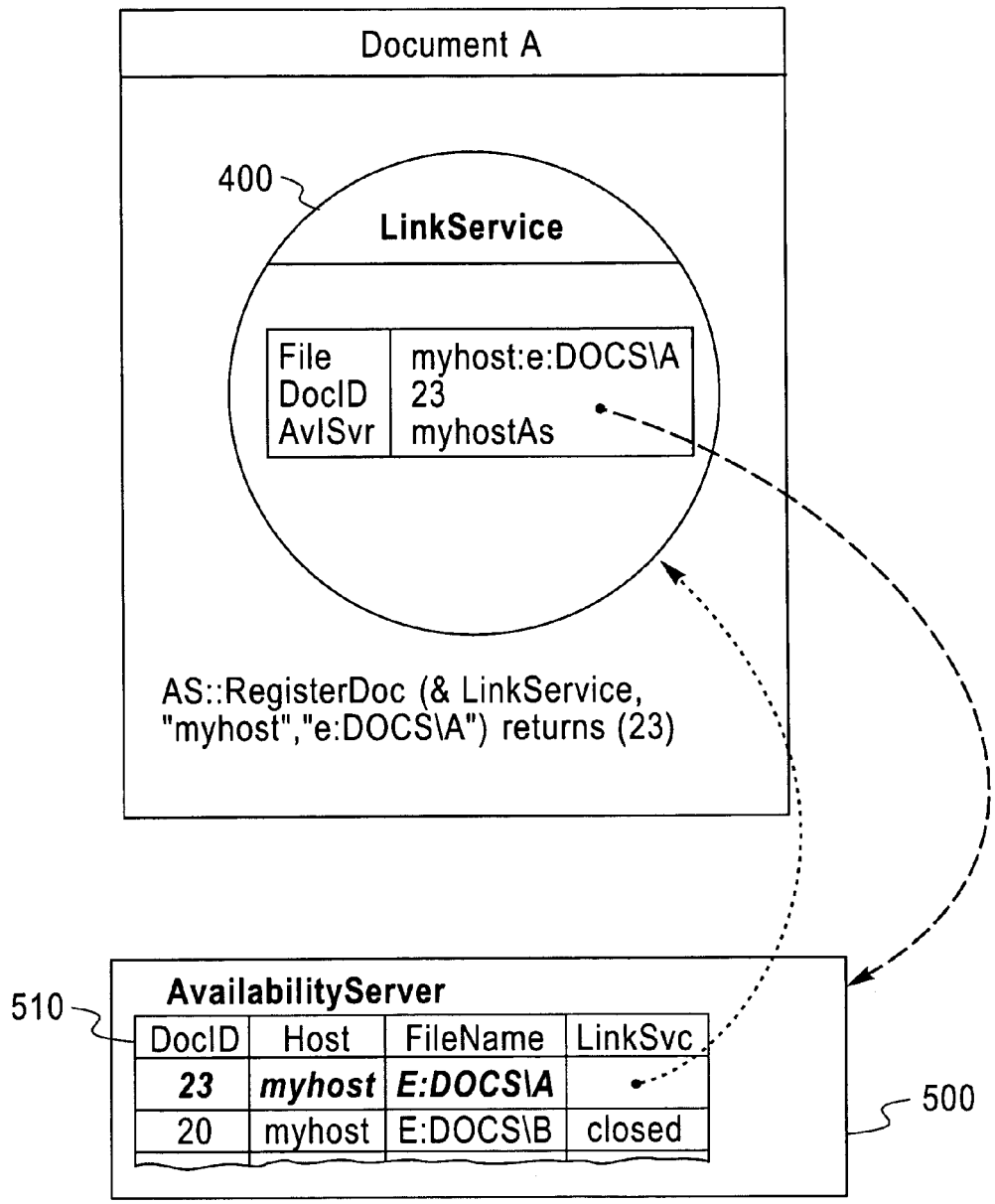
FIG. 6 is a pictorial representation of the operation of the LinkService object and the Availability Server of the present invention when a document is created.

When a document A is created on a computer system running an OpenDoc application, a LinkService object 400 associated with the document A is created within the document. The Linkservice object 400 registers with the Availability Server 500 that preferably resides on the same computer system. In the alternative, the Availability Server 500 may be a process that is executing on a remote computer system. The Availability Server 500 generates a unique documentID for document A, for example the number 23 as shown in FIG. 6, and generates a new entry in the table of documents 510 for document A. As shown in FIG. 6, the entry includes the documentID, the location of the document file, and a pointer to the LinkService object. The pointer may be set to "empty" to indicate that the document is closed. The Availability Server 500 then returns the documentID to the Linkservice object 400. The LinkService object 400 preferably stores the documentID and a pointer to the Availability Server 500.

Links are established between content elements in different parts. FIGS. 7–10 illustrate the operation of the LinkSpec object 100, the LinkSource object 200, the LinkTarget object 300, the LinkService object 400 and the Availability Server 500 in establishing a link between a source part X of a document A and a target part XX of a document B.

Figure 7:
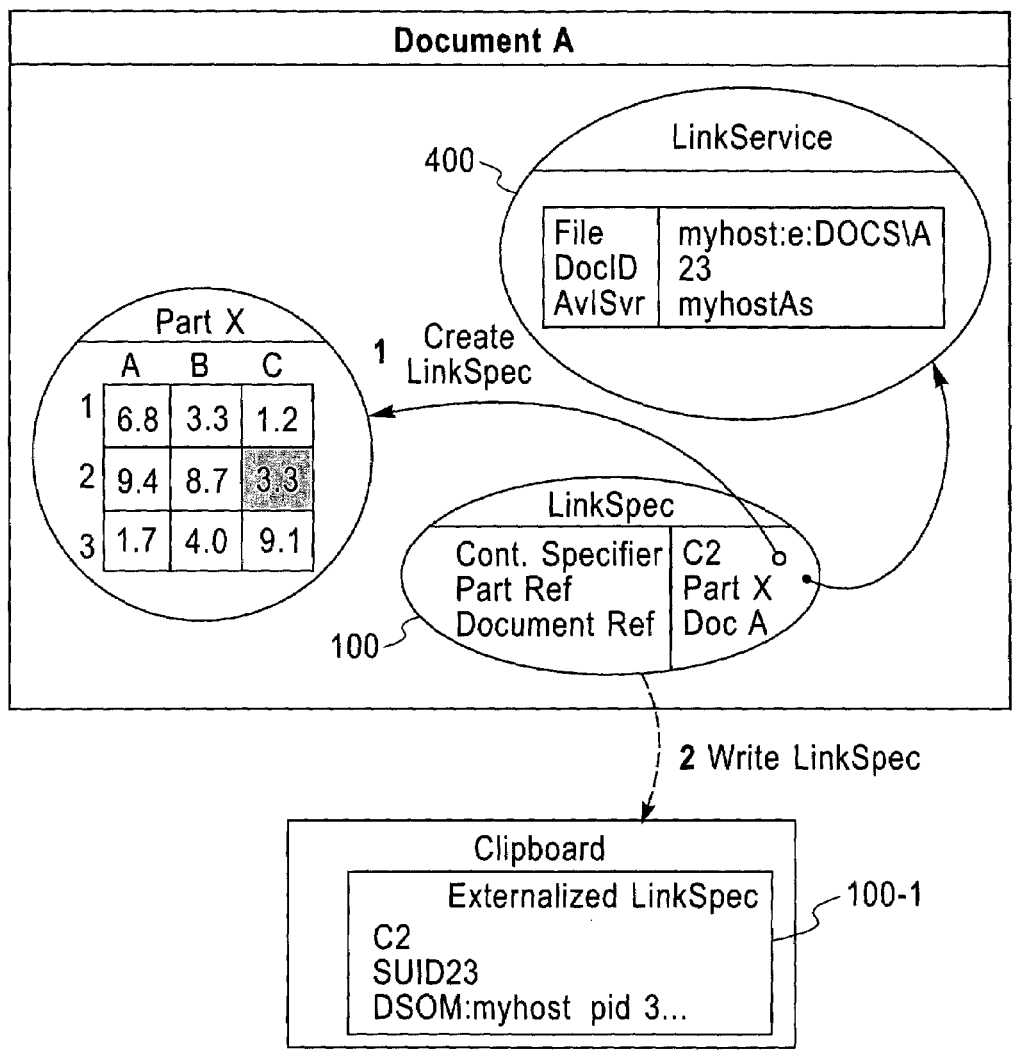
FIG. 7 is a pictorial representation of the operation of the source part in creating and externalizing the LinkSpec object of the present invention.

As shown in FIG. 7, the first step in establishing the link is to create a LinkSpec object 100 that identifies the content element of the source part X of the document A that will be the source of the link. The LinkSpec object 100 may be created, for example, by the source part X when source part X receives a request to copy selected content element of the part X to the clipboard or to the drag-and-drop. In FIG. 7 for example, the user has selected a cell C2 of a spreadsheet as the content to be linked. The Linkspec object 100 contains a content specifier that identifies the particular content element of the link. The LinkSpec object 100 also contains the pointer to the part, as well as a pointer to source document's LinkService object 400 as shown.

After the Linkspec object 100 has been created, the source part X calls a WriteLinkSpec method of the LinkSpec object 100. The WriteLinkSpec method converts the Linkspec object to a platform independent form and copies it to storage that is made accessible to other documents. The platform independent form may utilize, for example, a Bento storage unit and CORBA compliant externalized pointers, such as the externalized reference to a proxy to a stringID discussed in section 6–24 of the SOMobjects Developer Toolkit User's Guide, Version 2.1, October 1994, incorporated by reference above. As shown in FIG. 7, the storage is a clipboard. In the alternative, the storage may be a drag-and-drop buffer, a shared memory region, or a distributed repository.

Figure 8:
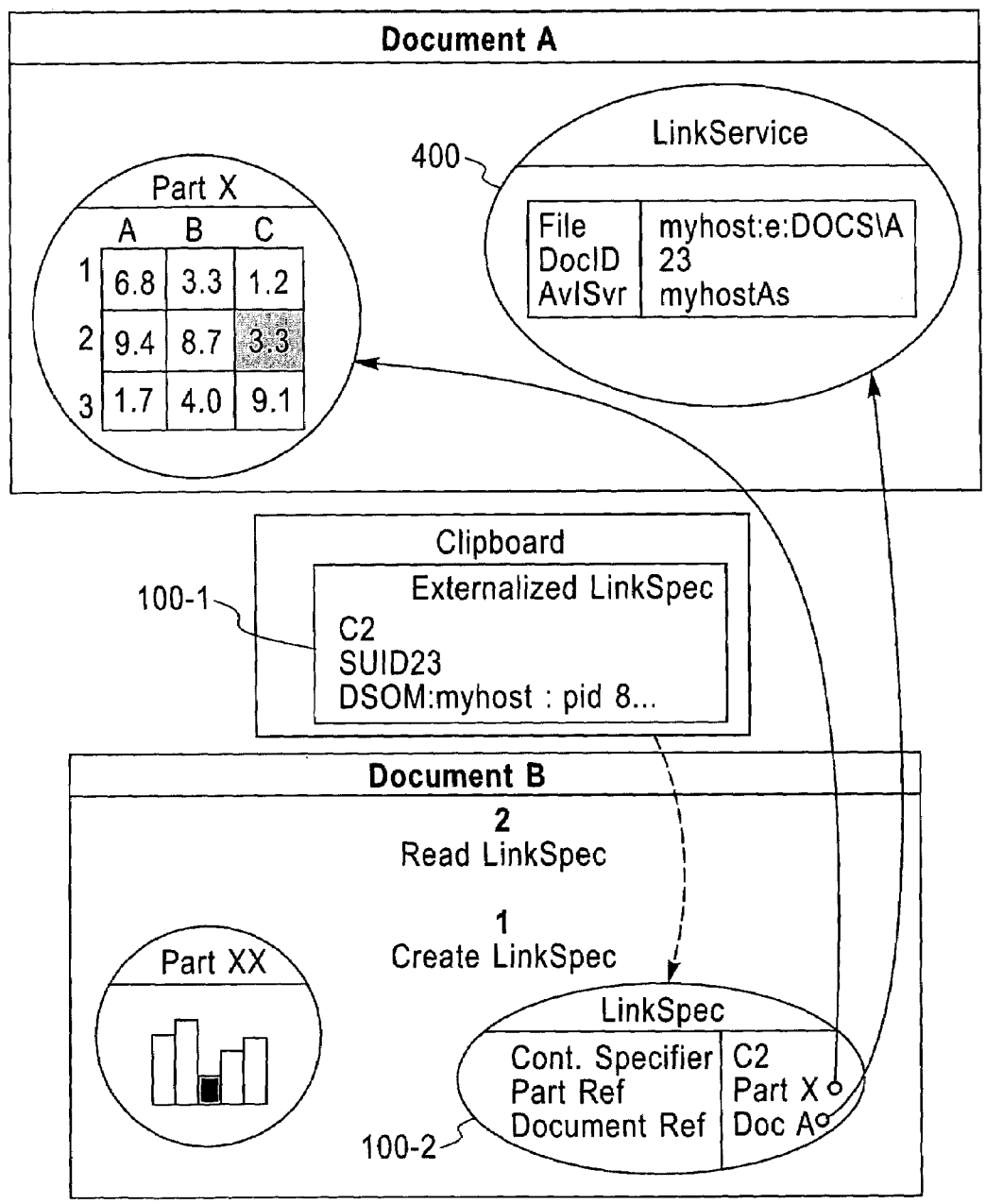
FIG. 8 is a pictorial representation of the operation of the target part in copying the externalized LinkSpec object according to the present invention.

After the Linkspec object 100 is converted and copied to storage, the linking operation turns to the target part XX of a document B as illustrated in FIG. 8. When the target part XX receives a request to establish a link with the content element specified by the externalized Linkspec object 100-1, which may be a user command such as a PASTE AS LINK or a drag and drop, the target part XX creates an in-memory LinkSpec object 100-2 and calls the ReadLinkSpec method, passing it a pointer to the externalized storage. The ReadLinkSpec method initializes the state of the in-memory LinkSpec object 100-2 to the state of the externalized LinkSpec object 100-1, thereby replicating the original LinkSpec object 100 in the target document B.

Figure 9:
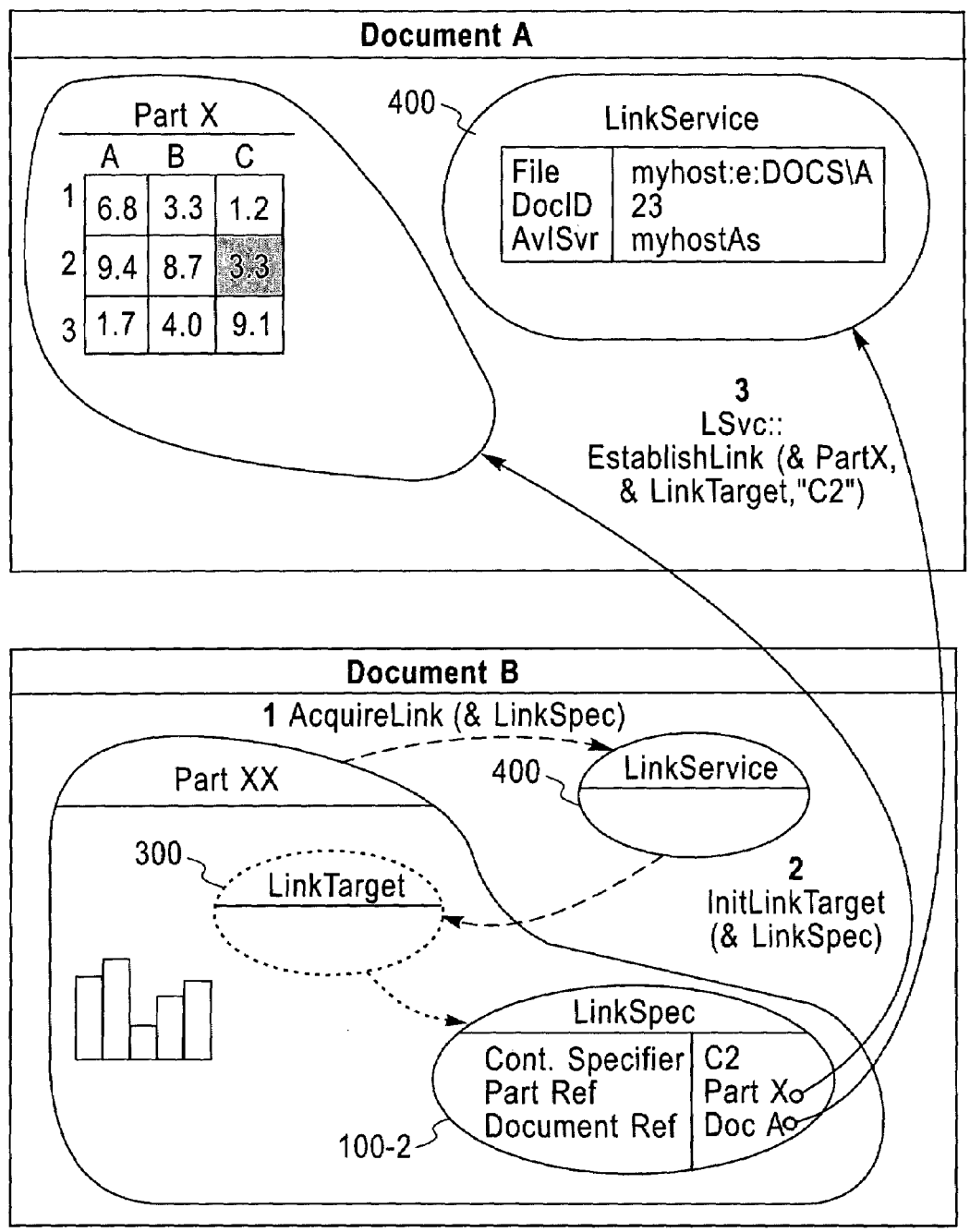
FIG. 9 is a pictorial representation of the operation of the target part in establishing a link with the source content identified by the copied LinkSpec object according to the present invention.

As shown in FIG. 9, the target part XX then requests that a link be created to the source content element specified by the LinkSpec object 100-2 by calling method "AcquireLink" on the LinkService object 400 in the target document B, passing a pointer to the LinkSpec object 100-2. In response to this request, a LinkTarget object 300 is created and initialized in the target document B. The pointer to the source document's LinkService object is then retrieved from the LinkSpec object 100-2, and the method "EstablishLink" is invoked on the LinkService object 400 of the source document A asking that a link be created. This message has several parameters, including the pointer to the source part X, a pointer to the target part YY, and the content specifier identifying the content element of the link.

When the Linkservice object 400 of the source document A receives this message, the LinkService object 400 responds by invoking the method "CreateLink" on the source part X asking that it create a link for content element specified by the given content specifier, for example C2 as shown in FIG. 10. If a LinkSource object already exists for the given content specifier (not shown), the source part X returns a pointer to it. If a LinkSource object does not exist for the given content specifier (as shown), the source part X responds by creating a LinkSource object 200, and then returns a pointer to this object.

In the case where the source part X creates a new LinkSource object 200, the LinkService object 400 of the source document A invokes the "RegisterLink" method on the Availability Server 500, passing a pointer to the new LinkSource object and the documentID for the document, for example 23 as shown in FIG. 10, to thereby register the new Linksource object 200. The "RegisterLink" method generates a new LinkID (unique to the Availability Server), for example 10 as shown, and associates the new LinkID with the given documentID. The pair <Availability Server Name, LinkID> henceforth serves as a persistent reference to the LinkSource object. The RegisterLink method then writes the DocumentID, the LinkID, and the pointer to the new Linksource object 200 as an entry in the Table of Linksource objects stored in the Availability Server 500, and sets the status field of the entry as "INDOC". The Availability Server 500 then returns the newly generated LinkID to the LinkService object 400 of the document A. The LinkService object 400, in turn, adds a new entry to the table of Link objects stored therein, The new entry includes the new linkID and the pointer to the new Linksource object 200. The LinkService object 400 of the source document A sends a message "InitLinkSrc" to the LinkSource object 200 that indicates the LinkID and the Availability Server name assigned to it by the Availability Server. The LinkService object 400 then calls the "AddTarget" method of the LinkSource object 200, passing several parameters including a pointer to the LinkTarget object 300. The LinkSource object 200, upon invocation of the "AddTarget" method, determines whether the LinkTarget object is local or not. Upon return, the LinkSource object 200 will notify the LinkTarget object 300 whether the LinkTarget object is local or not and which tracking mode is in effect. The tracking mechanism is described below in more detail. If the second mode of tracking is in effect, the LinkSource object 200 will retain a pointer to the LinkTarget object in its table of targets with a newly generated connectionID. This connectionID will be returned to the LinkTarget object.

At this point in link establishment, all of the object method invocations return. More specifically, the source part X returns the pointer to the LinkSource object 200 to the LinkService object 400 in the source document A. The LinkService object 400 in the source document A returns the LinkID of the LinkSource object 200, a pointer to the Availability Server 500, and the name of the Availability Server to the LinkTarget object 300 of part XX. The name may be used to locate the Availability Server and restart it if necessary. The LinkTarget object 300 returns a pointer to itself to the LinkService object 400 within the target document B, which updates its table of LinkTarget objects, and then returns the pointer to the link target object to the target part XX. The target part XX can then associate the linked content item (e.g., a bar graph element as shown) to the LinkTarget object.

Figure 11:
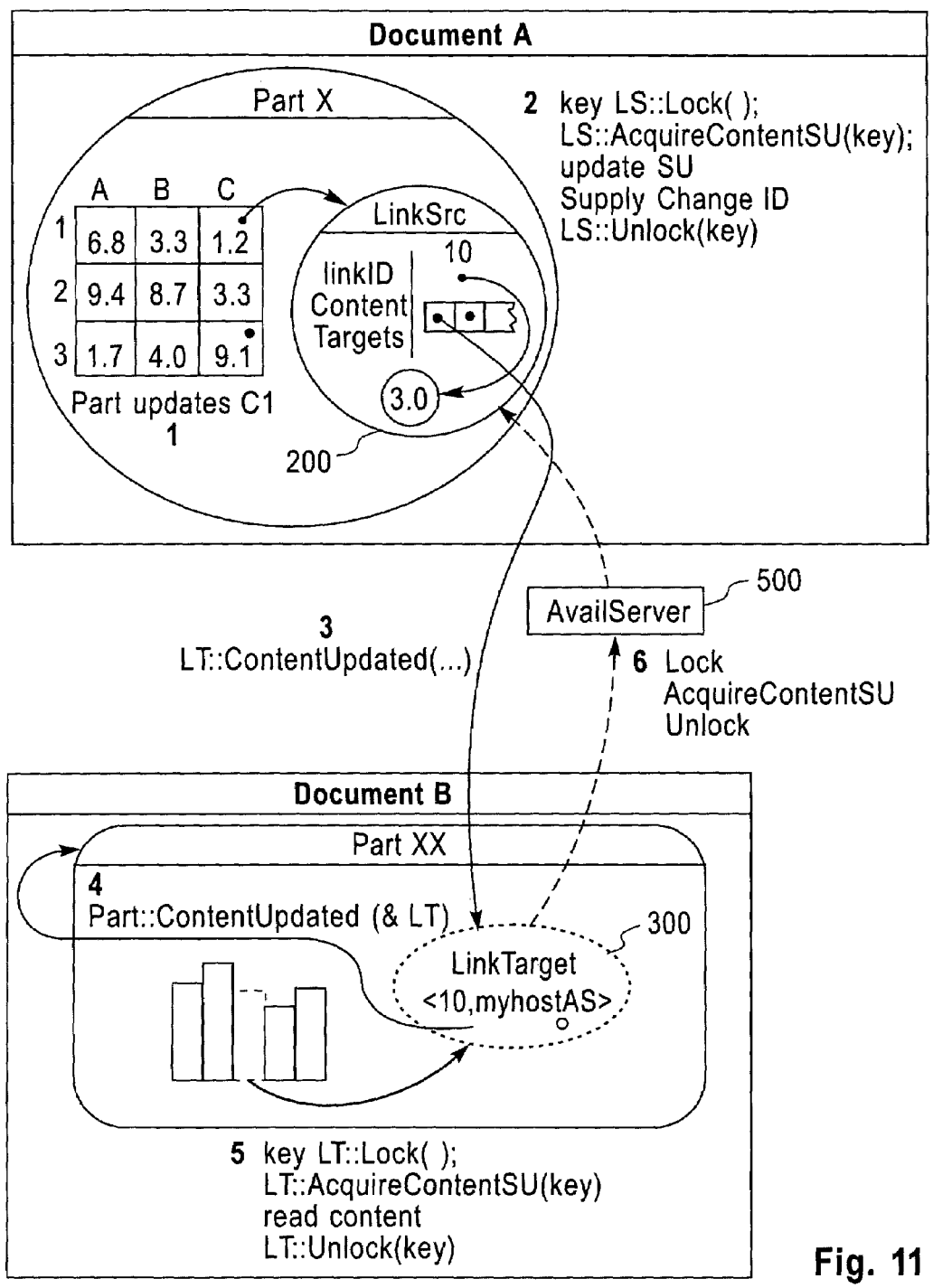
FIG. 11 is a pictorial representation of the operation of the source part and the LinkSource object in updating linked content (steps 1 and 2), and notifying the target part of the update(steps 3 and 4)
Figure 12:
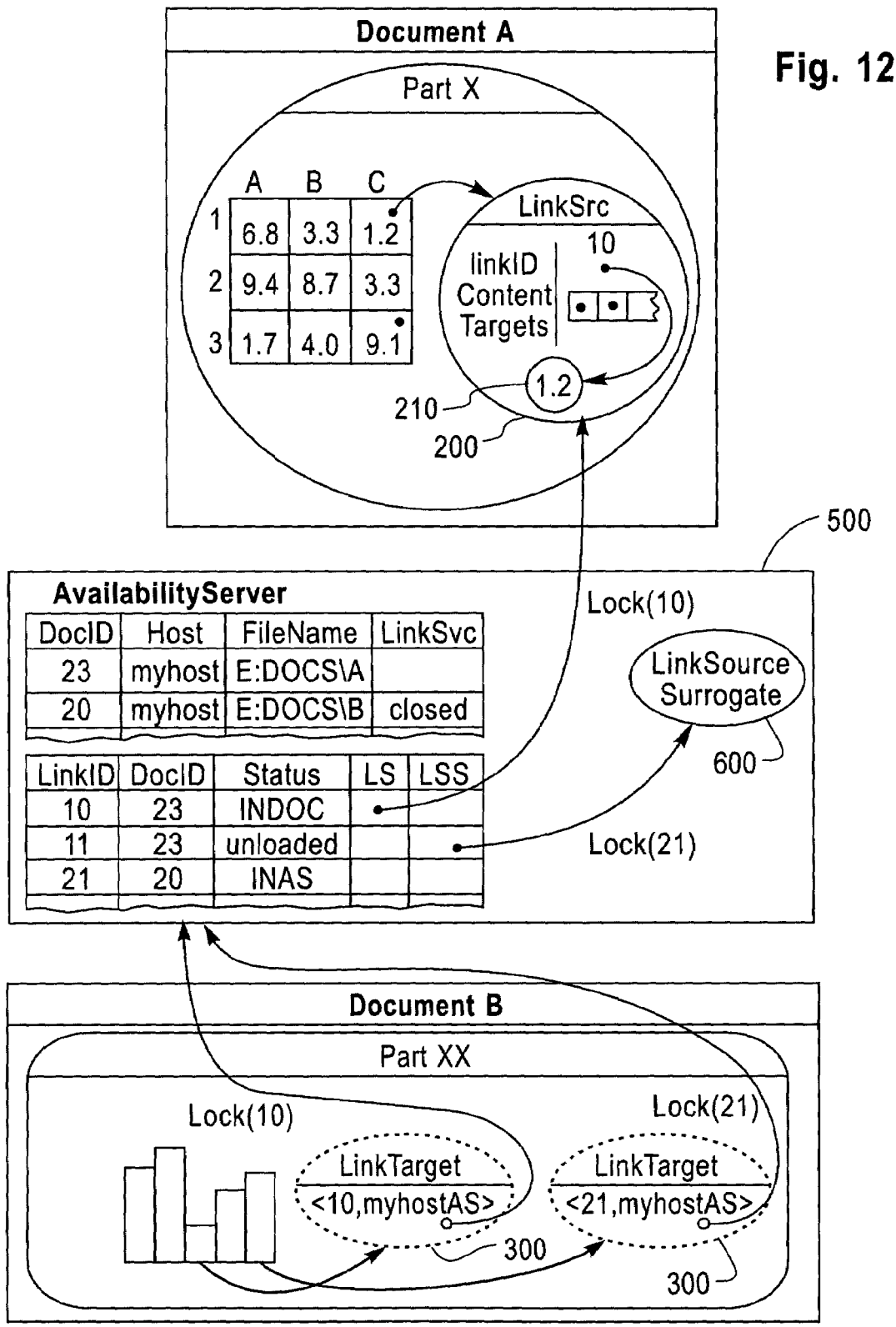
FIG. 12 is a pictorial representation of the operation of the Availability Server in routing messages from the LinkTarget object to the LinkSource object or the LinkSourceSurrogate object according to the present invention.
Figure 13:
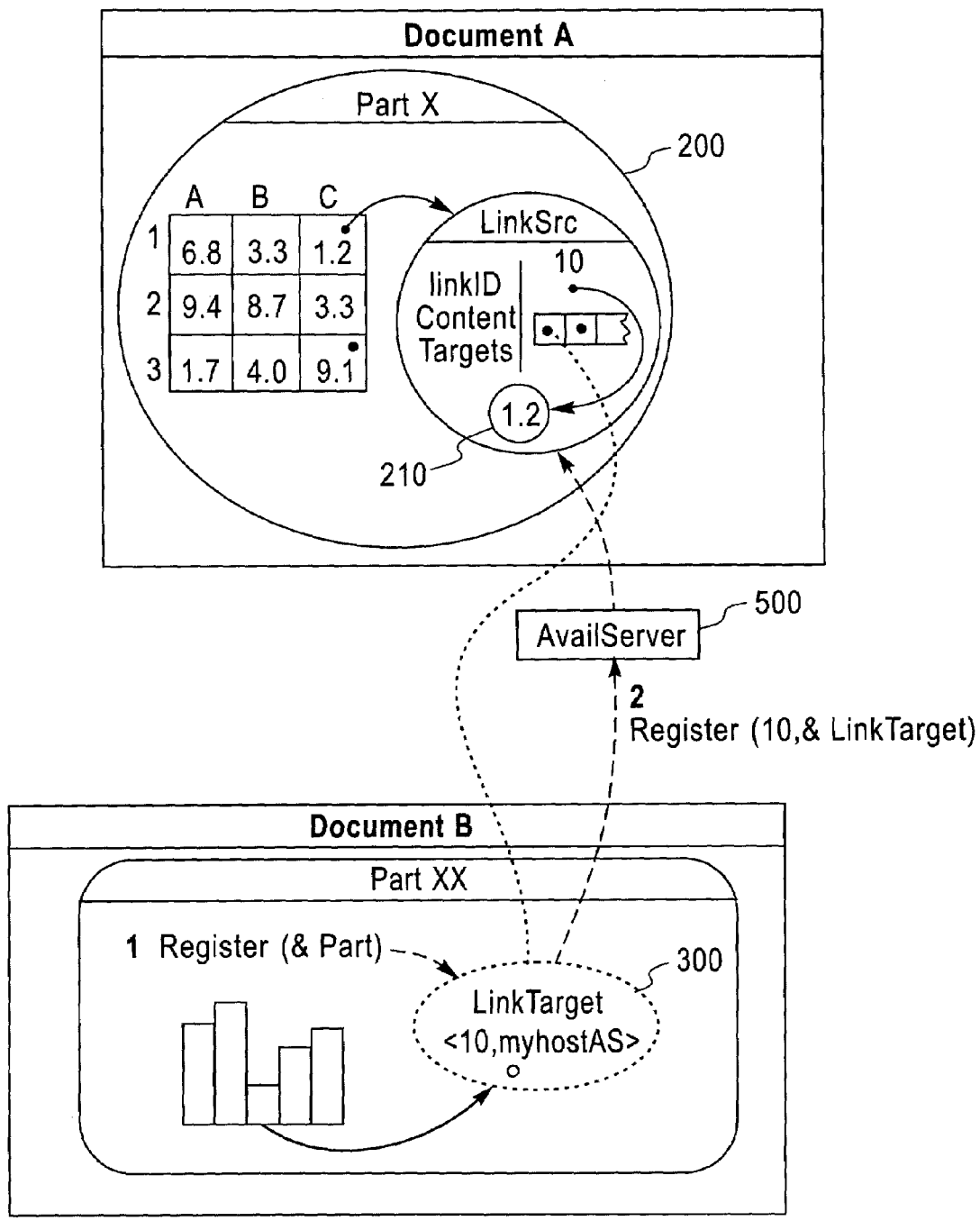
FIG. 13 is a pictorial representation of the operation of the Linktarget object, the Availability Server and the LinkSource object (or the LinkSourceSurrogate object) when a target part registers to be notified of changes to particular link content within a part of a document according to the present invention.

FIGS. 11–13 illustrate the operation of LinkSource object 200, LinkTarget object 300, and the Availability Server 500 when the source part X updates the content element that is the source of the link. When the source part's content element changes, the source part X reflects the changed content element in the Content object 210 of the LinkSource object 200. The source part X controls the frequency with which it updates the Content object 210 of the LinkSource object 200. As shown in FIG. 11 (steps 1–4), to update the Content object 210, the source part X (1) locks the Link-Source object 200, (2) acquires the Content object 210 from the LinkSource object 200, (3) updates the Content object 210 to reflect the changes in the content element, (4) notifies the LinkSource object 200 that the content element has changed by supplying a ChangeID, and (5) releases the lock. When the lock on the LinkSource object 200 is released, the LinkSource object 200 accesses its table of link targets and notifies those LinkTarget objects registered with the particular LinkSource object 200 that the linked content element has been updated. The LinkTarget object 300, upon receipt of this message, invokes the "ContentUpdated" method (step 4) of the target part, passing it a set of parameters including a pointer to itself. The target part XX responds as described below with respect to steps 5–6 of FIG. 11.

The target part XX can communicate to the LinkTarget object 300 to (1) check to see if a new version of the Content object 210 exists by examining the changeID stored in the LinkSource object 200; (2) request the LinkSource object 200 to grant the target part XX a lock on the Content object 210 of the LinkSource object 200 such that the target part X can read the Content object 210 and update its own content, if necessary; (3) register/unregister with the LinkSource object 200 to receive/cancel notification of future changes; and (4) request that the LinkSource object 200 provide a description. These calls from the LinkTarget object 300 of the target part XX to the source part X pass a LinkID to identify the particular link related to the call. Generally, the calls from the LinkTarget object 300 of the target part XX to the source part X may be routed directly to the LinkSource object 200 in the source part X or, in the alternative, to the availability server 500. In the preferred embodiment, when the source part X and the target part XX are located in the same document, the calls from the LinkTarget object 300 of the target part XX to the LinkSource object 200 of the source part X are routed directly to LinkSource object 200; yet, when the source part X and the target part XX are located in separate documents (either in the same computer system or in different computer systems), such calls are routed to the Availability Server 500. The Availability Server 500 will know whether the source document is open or closed, where the document is located, and will handle the calls as discussed below.

As shown in FIG. 12, the Availability Server 500, upon receiving a call (e.g., lock) from the LinkTarget object 300 of the target part XX, determines whether the document owning the LinkSource object 200 associated with the particular LinkID included in the call is open or closed. If the document is open, the Availability Server 500 must route the call to LinkSource object 200 in the open document. If the document is closed, the Availability Server 500 must route the call to a LinkSourceSurrogate object 600 that resides in the Availability Server 500. The LinkSourceSurrogate object 600 holds the Content object 210 and the auxiliary state of the original LinkSource object 200. The LinkSourceSurrogate object 600 is able to service all calls directed from LinkTarget object 300 to the LinkSource object 200 (except requests to put the LinkSource object 200 in view on the display, which cannot be satisfied when the document owning particular LinkSource object 200 is closed).

More specifically, the Availability Server 500 begins by checking the status field within the Table of LinkSource objects stored in the Availability Server 500 that is associated with the particular linkID. If the status field is INDOC (i.e., the document is open and the link is also open), the Availability Server 500 retrieves the pointer to the Link-Source object 200 associated with the particular LinkID and forwards the call there.

If the status field is INAS (i.e., the document is closed and a LinkSourceSurrogate object 600 exists in the Availability Server), the Availability Server 500 retrieves the pointer to the LinkSourceSurrogate object 600 associated with the particular LinkID and forwards the call to the LinkSourceSurrogate object 600.

If the status field is INBOTH (i.e., the LinkSource object 200 exists in the document and the LinkSourceSurrogate object 600 exists in the Availability Server 500), the Availability Server 500 treats the call exactly as for the status INDOC, except that upon completion of an Unlock call to the LinkSource object 200, the LinkSourceSurrogate object 600 is destroyed and the status field changes to INDOC.

Finally, if the status field is UNLOADED, (neither the LinkSourceSurrogate Object 600 nor the LinkSource object 200 exist in the document), the Availability Server 500 checks the Table of Documents 510 stored in the Availability Server 500 to determine if the document associated with the LinkID is currently open or closed. If it is open, the Availability Server 500 requests the LinkService object 400 in the document to acquire access to the LinkSource object 200 and return a pointer to the LinkSource object 200. After receiving the pointer to the LinkSource object, the call is forwarded to the LinkSource object 200. The pointer to the LinkSource object 200 is stored in the appropriate entry in the table of link source objects 520 stored in the Availability Server 500, and the status field of this entry is changed to INDOC. If the document is closed, the Availability Server 500 creates a LinkSourceSurrogate object 600, initializes the LinkSourceSurrogate object 600 by retrieving content from the saved document file (whose name and location has been stored) and the auxiliary state from the Availability Server 500 table of auxiliary states. Once the LinkSourceSurrogate object 600 is created and initialized, the call is forwarded to the LinkSourceSurrogate object 600. The pointer to the LinkSourceSurrogate object 600 is stored in the appropriate entry in the table of link Source objects 520 stored in the Availability Server 500, and the status field of this entry is changed to INAS.

As mentioned above, the target part XX may communicate to the LinkTarget object 300 to check to see if the content element that is the source of link has changed. This is accomplished by the LinkTarget object 300 routing a message via the Availability Server 500 to the LinkSource object 200 or the LinkSource object 600 requesting the current changeID. The LinkSource object 200 (or the LinkSourceSurrogate object 600) retrieves the current changeID, which is stored in the LinkSource object 200 (or LinkSourceSurrogate object 600), and returns the current changeID to the LinkTarget object 300. The LinkTarget object 300 forwards the changeID to the target part XX. The target part XX can compare the changeID supplied by the LinkTarget object 300 with the previously stored changeID to determine if the content element that is the source of the link has been updated.

As mentioned above, the target part XX may also communicate to the LinkTarget object 300 to request the LinkSource object 200 (or the LinkSourceSurrogate object 600) to grant the target part XX a lock on the Content object 210 of the LinkSource object 200 (or LinkSourceSurrogate object 600) such that the target part X can read the Content object 210. This may occur upon receiving notification that the content element of the link has been updated, or may occur upon receiving a predetermined user command. As shown in FIG. 11 (step 5 and 6), to obtain a lock on the Content object 210, the target part XX invokes a "Lock" method on the Linktarget object 300. The "Lock" method of the LinkTarget object 300 calls via the Availability Server 500 the LinkSource object 200 (or the LinkSourceSurrogate object 600) requesting a lock on the Content object 210, passing the LinkID. If the Content object 210 is locked, the request is blocked until the Content object 210 is unlocked, or a waiting time-limit expires. If the Content object 210 is unlocked, the LinkSource object 200 (or the LinkSourceSurrogate object 600) grants a lock to the LinkTarget object 300 and returns a key to the lock to the Content object 210, which then returns the key to the target part XX. Upon receiving the key to the lock, the target part XX invokes a method "AcquireContentStorageUnit" on the LinkTarget object 300, passing the key. In the "AcquireContentStorageUnit" method, the LinkTarget object 300 via the Availability Server 500 calls the LinkSource object 200 (or the LinkSourceSurrogate object 600) requesting a pointer to the Content object 210, passing the key and the linkID. The LinkSource object 200 (or the LinkSourceSurrogate object 600) checks that the key is valid and, if so, returns to the LinkTarget object 300 a pointer to the Content object 210, which returns the pointer to the target part XX. Upon receiving the pointer to the Content object 210, the target part XX sends one or more messages to the Content object 210 within the LinkSource object 200 (or within the LinkSourceSurrogate object 600) requesting that the Content object 210 transmit to the target part XX portions of the data included in the Content object 210. Upon receipt of this message, the Content object 210 returns the portions of data to the target part XX. Upon receiving the content data from the Content object 210, the target part XX may update the content of the link, if necessary. After retrieving all the content data it desires, the target part XX invokes an "Unlock" method on the LinkTarget object 300, passing the key. In the "Unlock" method, the LinkTarget object 300 via the Availability Server 500 requests that the LinkSource object 200 (or the LinkSourceSurrogate object 600) unlock the Content object 210, passing the key and the LinkID. Upon receiving the unlock request, the LinkSource object 200 (or the LinkSourceSurrogate object 600) checks that the key is valid and, if so, unlocks the Content object 210 and returns a message to the LinkTarget object 300 that the Content object 210 has been unlocked, which then returns to the target part XX.

The target part XX may also communicate to the LinkTarget object to register with the LinkSource object to receive notification of future changes. As shown in FIG. 13, the target part XX begins by calling the LinkTarget object 300 requesting that the Linktarget object 300 register itself to receive notification of future updates to the Content object 210 that is the source of the link, passing a pointer to itself. The Linktarget object 300, in turn, stores the pointer to the target part XX and calls via the Availability Server 500 the "Register" method of the LinkSource object 200 (or the LinkSourceSurrogate object 600), passing the LinkID, a pointer to the Linktarget object 300 and a description of the LinkTarget object (not shown). The LinkSource object 200 (or the LinkSourceSurrogate object 600), upon receiving this call, generates an entry in the table of targets including a pointer to the Linktarget object, a description of the Linktarget object, and a new connectionID. The LinkSource object 200 (or the LinkSourceSurrogate object 600) then returns the connectionID to the LinkTarget object 300, which stores the connectionID for un-registration. However, if the second mode of tracking is in effect for this LinkSource object 200, the LinkTarget object 300 will already have a connectionID. In this case, the LinkSource object 200 (or the LinkSourceSurrogate object 600) does not generate a new entry in the table of targets.

Similarly, the target part XX may also communicate to the LinkTarget object to un-register with the LinkSource object such that the target part does not receive notification of future changes. The target part XX begins by calling the LinkTarget object 300 requesting that the Linktarget object 300 unregister itself such that it does not receive notification of future updates to the Content object 210 that is the source of the link. The Linktarget object 300, in turn, calls via the Availability Server 500 the "UnRegister" method of the LinkSource object 200 (or the LinkSourceSurrogate object 600), passing the LinkID and the connectionID previously received and stored during registration. The LinkSource object 200 (or the LinkSourceSurrogate object 600), upon receiving this call, deletes the entry in the table of targets corresponding to the connectionID. The method invocations then return. However, if the second mode of tracking is in effect for this LinkSource object, the entry is retained and updated to indicate that the LinkTarget object should no longer receive updates.

Similarly, the target part XX may also communicate to the LinkTarget object to request that the LinkSource object provide a description of the source of the link or other relevant information. The target part XX begins by invoking the "GetLinkSourceDescr" of the LinkTarget object 300. The LinkTarget object 300, in turn, calls via the Availability Server 500 the LinkSource object 200 (or the LinkSourceSurrogate object 600) to request the description, passing the LinkID. The LinkSource object 200 (or the LinkSourceSurrogate object 600), upon receiving this call, retrieves the description from storage therein, and returns the description to the target part XX.

FIGS. 14–17 illustrate the operation of the LinkSource object 200, the LinkService object 400 of the source document A and the Availability Server 500 when the source document A is closed and re-opened. When an existing document is closed, the LinkService object 400 associated with the document invokes the method "DocClosed" on the Availability Server 500, passing the documentID stored therein. The location of the Availability Server 500 may be identified by the pointer stored by the LinkService object 400. If the pointer is not valid (e.g., the Availability Server 500 has crashed since the document A was opened), the name of the Availability Server 500 may be used to locate the Availability Server 500. In the "DocClosed" method, the Availability Server 500 clears the pointer to the LinkService object of the entry within the table of documents 510 corresponding to the supplied documentID to thereby indicate that the corresponding document is closed. In addition, when source document A is closed, the LinkSource object 200 associated with each link in the document is destroyed, but its persistent representation remains in the document. This is accomplished by the LinkService object 400, for each LinkSource object in the source document, invoking the "LinkClosed" method on the Availability Server 500, passing the current auxiliary state retrieved from the LinkSource object 200 and the linkID associated with that LinkSource object. The Availability Server 500 stores the auxiliary state as entry in the table of auxiliary states keyed by LinkID. In addition, the Availability Server 500 updates the status field associated with the LinkID in the Table of LinkSource objects 520 from "INDOC" to "UNLOADED". Since a document cannot be closed while locks are held on LinkSource objects or LinkSourceSurrogate objects within the document, the INBOTH case cannot exist.

Figure 14:
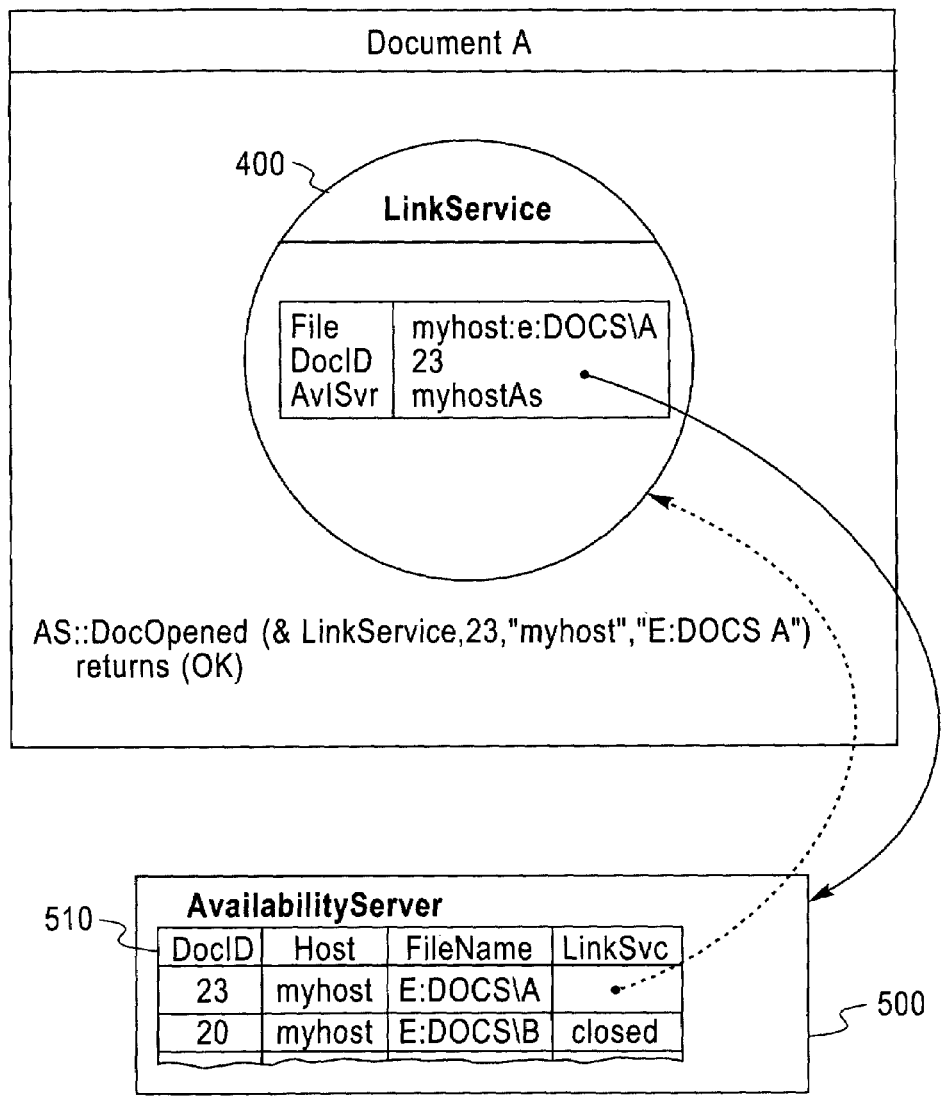
FIGS. 14–17 are pictorial representations of the operation of the LinkService object and the Availability Server when an existing document is opened according to the present invention.
Figure 15:
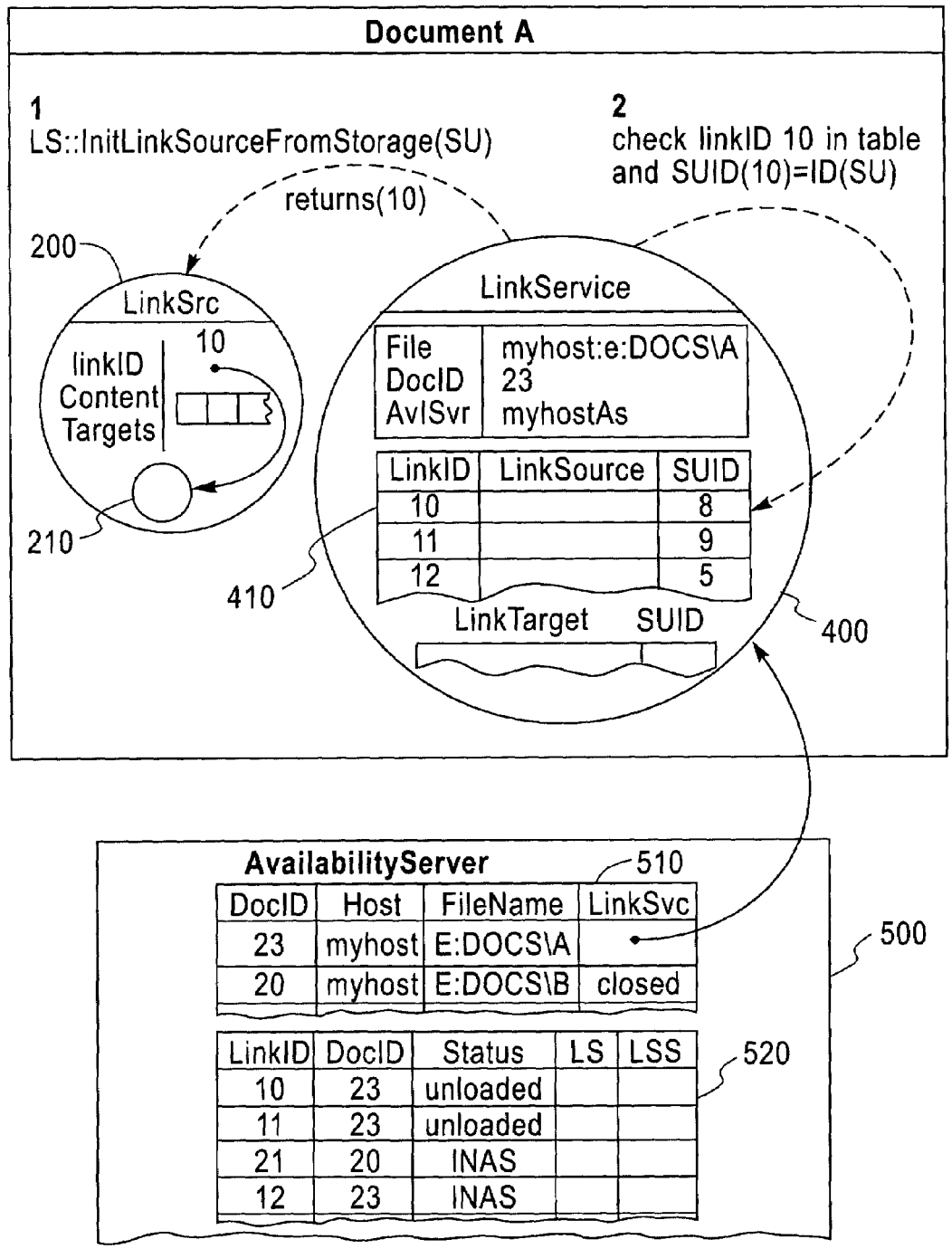

As shown in FIG. 14, when an existing document is re-opened, the LinkService object 400 associated with the document first acquires a pointer to the Availability Server 500. This may be accomplished by supplying the name of the Availability Server 500 to the CORBA compliant naming service. If the Availability Server 500 is not currently running, it is started. Next, the LinkService object 400 then invokes the method "DocOpened" on the Availability Server 500, passing the documentID stored therein. In the "DocOpened" method, the Availability Server 500 also updates the entry corresponding to the supplied documentID in the Table of Documents 510 to include a pointer to the LinkService object 400, thereby indicating that the corresponding document is open. In addition, the LinkService object 400 in the open document's process and the Availability Server 500 each check that the current document file location matches the stored document file location. In the event of a mismatch, additional recovery actions are performed to take into account the possibility that the document file has been copied or moved, or that the Availability Server 500 has been restored from an out-of-date file. The recovery actions are discussed in more detail below.

In addition, when an existing document is opened, the parts of the document are re-created from their persistent representation. More specifically, for each LinkSource object 200 in the part so reconstructed, the LinkService objects 400 begins a two step initialization process.

Figure 16:
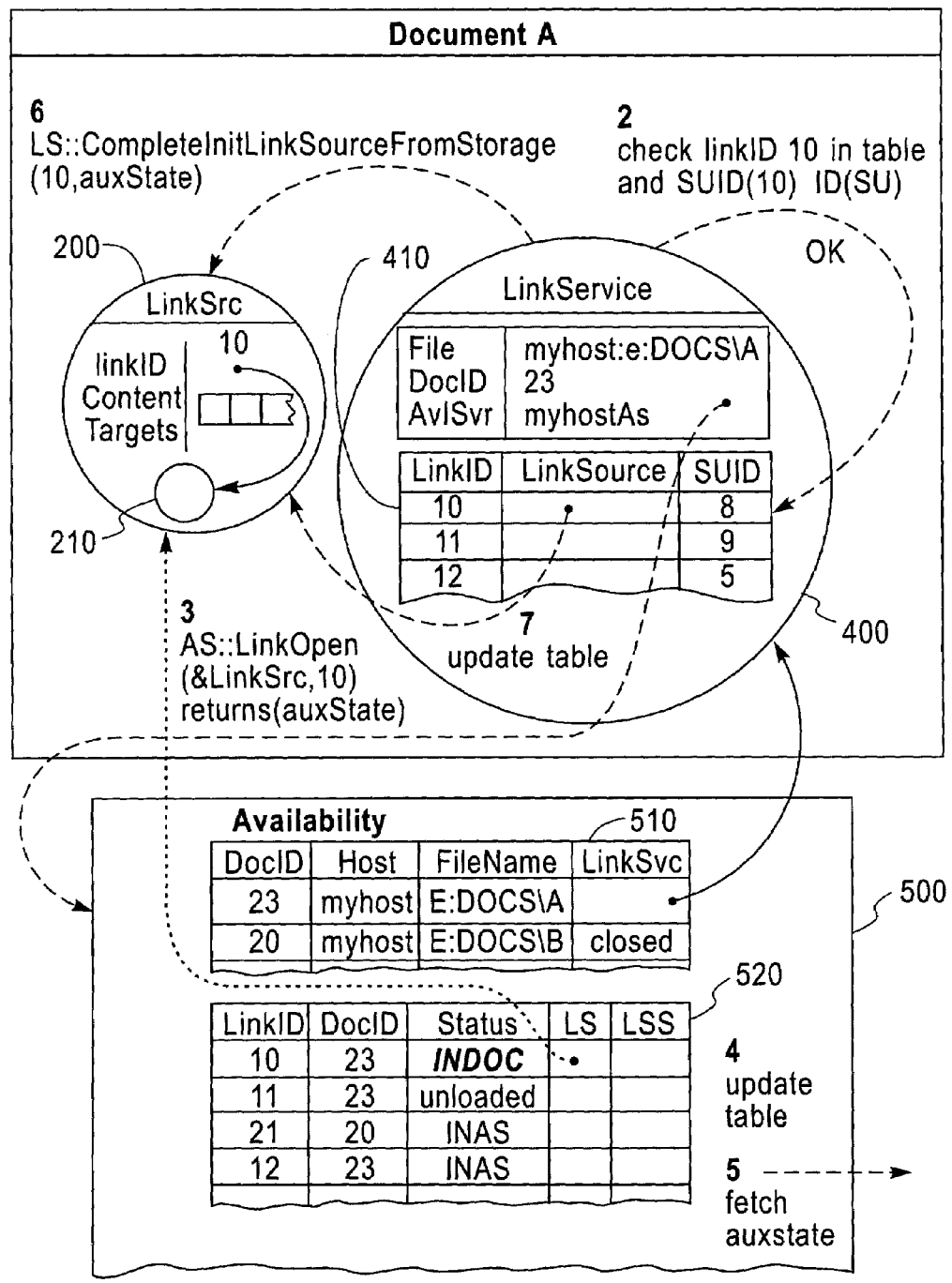

In the first step, as shown in FIG. 16 the LinkService object 400 invokes the "InitLinkSourcefromStorage" method on the LinkSource object 200. In the "InitLinkSourcefromStorage" method, the LinkSource object 200 returns the LinkID that was previously assigned to the LinkSource object 200 and saved on persistent storage. The LinkService object 400 checks whether the LinkID supplied by the LinkSource object 200 matches an entry in the Table of LinkSource objects 520 in the LinkService object 400. If a match is not found, or if the LinkID is associated with a different LinkSource object (which may be determined by checking storage unit identifiers), then it is detected that the LinkSource object 200 is a copy of the original LinkSource object. Initializing such a copy will be discussed below. If a match is found, the current LinkSource object 200 is the original LinkSource object, and the initialization process proceeds to the second step as illustrated in FIG. 16.

In the second step, the LinkService object 400 invokes a "LinkOpen" method on the Availability Server 500, passing the LinkID and a pointer to the LinkSource object 200. The Availability Server 500 updates the status field of the entry within the table of LinkSource objects 520 corresponding to the LinkID to "INDOC" and also stores a pointer to the LinkSource object 200 in the entry. The Availability Server 500 returns to the LinkService object 400 the auxiliary state within the table of auxiliary states that is associated with the LinkID. The auxiliary state may have changed while the document was closed. The LinkService object 400 forwards the LinkID (which in the case of a non-copy is the same linkID) and the auxiliary state to the LinkSource object 200 by invoking the "CompleteInitLinkSourcefromStorage" method on the LinkSource object. The LinkSource object 200 uses the auxiliary state it has previously stored persistently, or the auxiliary state supplied by the Availability Server 500, whichever is more recent. Moreover, if the Availability Server 500 previously created a LinkSourceSurrogate object 600 for this LinkSource object 200, the Availability Server 500 destroys the LinkSourceSurrogate object 600, unless the LinkSourceSurrogate object 600 is in a locked state. If the LinkSourceSurrogate object 600 is in a locked state, the LinkSourceSurrogate object 600 is retained until it is unlocked. In this case, when the Availability Server 500 returns to the LinkService object 400, the Availability Server 500 also informs the LinkService object 400 that the LinkSourceSurrogate 600 is locked. The LinkService object 400, as part of the "CompleteInitLinkSourcefromStorage" method will cause the LinkSource object 200 to initialize in a locked state. The LinkService object 400 updates its table of LinkSource objects 520 to include an entry corresponding to the LinkSource object 200.

Moreover, when the document as a whole is moved, the Availability Server 500 is called and given the documentID and the new location of the document. The Availability Server 500 then updates the entry corresponding to the supplied documentID in the Table of Documents 510 to include the new document location.

In addition, to minimize main memory space required by the Availability Server 500, the Availability Server 500 may identify from time to time certain entries, for example those entries corresponding to the least recently used LinkSourceSurrogate objects, in the table of LinkSource objects 520 whose status field is "INAS", destroy the corresponding LinkSourceSurrogate objects 600 and convert the status field of one or more of the entries to "UNLOADED" if the corresponding LinkSourceSurrogate object 600 is not locked.

In addition, the source part X may include a tracking interface to the LinkSource object that permits the source part X to query the LinkSource object about the target parts to which the LinkSource object is linked. The response to this query may be a description of one or more of the link targets including the host name, document name, and part description of the target part, along with any additional information provided by the target part. The description the target part may also indicate whether or not the target part is currently open or closed. Preferably, the tracking interface can be set in one of two modes: in the first mode, the Linksource object returns the description of only those link targets that are either local (intra-document) or registered (including local and non-local registered targets). In the second mode, the Linksource object returns a description of all targets, including the local, non-local, registered, and non-registered targets. The mode is set by the source part X when the LinkSource object is created.

Operating the tracking interface in the first mode as described above may be used to improve the performance of the system by limiting the amount of information stored by the LinkSource. Moreover, it also improves the performance of the system by reducing the number of calls that are made from the link target to the Link source part. The tracking mechanism operates as follows:

1) At link establishment time, the LinkSource object sends a message to the LinkTarget object indicating whether the tracking mechanism associated with the link source is operating in the first or second mode, and whether the link is local;

2) If the LinkSource object indicates that the tracking mechanism is operating in the first mode, then the Linktarget object need only supply the LinkSource object with its description when registering, or to update the additional information;

3) If the LinkSource object indicates the tracking mechanism is operating in the second mode, the LinkTarget object supplies the Linksource object with its description whenever the document in which the LinkTarget object resides is opened, closed, or moved, or when the additional information changes; and 4) If the LinkSource object indicates the tracking mechanism is operating in the second mode, when a copy is made of the LinkTarget object thereby introducing a new LinkTarget object, the new LinkTarget object must send a message to the LinkSource object that includes the description of the copied LinkTarget object.

In another aspect of the present invention, a document may include an interface to retrieve and display all LinkSource objects and/or LinkTarget objects in the document, or in a particular part within the document. The displayed information related to a LinkSource object preferably includes the machine name, document name, part name, a content description of the source, and other descriptive information related to the Source. The displayed information related to a LinkTarget object preferably includes the machine name, document name, part name, a description of the target, and a boolean flag indicating whether or not the target is registered.

To retrieve and display a description of all LinkSource objects in a document, the document begins by invoking the "GetLinkSources" method on the LinkService object 400. The LinkService object 400 retrieves from its table of LinkSource objects 410 pointers to those LinkSource objects within the document and returns the pointers to the document. In turn, for each returned pointer, the document invokes the "DescribeSelf" method on the LinkSource object identified by the pointer, which returns its description stored therein. The descriptions retrieved from each LinkSource object are then displayed to the user.

To retrieve and display a description of all LinkSource objects in a particular part of a document, the document begins by invoking the "GetLinkSourcesfor Part" method on the LinkService object 400, passing a reference to the particular part. The LinkService object 400 retrieves from its table of LinkSource objects 410 pointers to those LinkSource objects within the document that match the supplied part reference and returns the pointers to the document. In turn, for each returned pointer, the document invokes the "DescribeSelf" method on the LinkSource object identified by the pointer, which returns its description stored therein. The descriptions retrieved from each LinkSource object are then displayed to the user.

To retrieve and display a description of all LinkTarget objects in a document, the document begins by invoking the "GetLinkTargets" method on the LinkService object 400. The LinkService object 400 retrieves from its table of LinkTarget objects 420 pointers to those LinkTarget objects within the document and returns the pointers to the document. In turn, for each returned pointer, the document invokes the "DescribeSelf" method on the LinkTarget object identified by the pointer, which returns its description stored therein. The descriptions retrieved from each LinkTarget object are then displayed to the user.

In addition, a user may identify a particular LinkSource object and then request that a description of all targets linked to the particular LinkSource object be displayed. The user may identify the particular LinkSource object by selecting it from the displayed descriptions, which are generated as described above, or by clicking on selected linked content in a part. To retrieve and generate the description of all targets linked to the identified LinkSource object, the document begins by invoking the "GetLinkTargets" method on the identified LinkSource object. The LinkSource object retrieves from its table of targets the description of the targets stored therein, and returns the descriptions to the document. Each description is then displayed to a user.

Moreover, an interface may be provided that allows the user to identify a particular LinkSource object and to select and break the link to the LinkTarget objects linked thereto. When the tracking mechanism is operating in the first mode, the interface may be used to select and break the link to any of the LinkTarget objects that are registered or local to the particular LinkSource object. When the tracking mechanism is operating in the second mode, the interface maybe used to select and break the link to any LinkTarget object linked to the particular LinkSource object. The interface operates as described above to generate and display a description of the LinkTarget objects which are either local or registered to the LinkSource object (in case of tracking mode 1) or of all the Targets linked to the LinkSource (in case of tracking mode 2), as described above. The description of the LinkTarget objects may be arranged in the form of a table that includes an entry for each Linktarget object. Each entry of the table is associated with the connectionID of the corresponding LinkTarget object and a pointer to the LinkSource object linked to the corresponding LinkTarget object. A gesture or key stroke is used to select one of the entries. Upon selection of an entry, the interface invokes the "RemoveLinkTarget" of the LinkSource object, passing the connectionID associated with the selected entry. In turn, the LinkSource object deletes the entry in the table of targets stored therein that corresponds to the supplied connectionID. The method invocations then return, and the interface displays the table in updated form. If the LinkTarget object whose link is being broken is currently registered, the LinkSource object will inform the LinkTarget object by calling the "RemoveLink" method of the Linktarget object. Otherwise, the LinkSource object will inform the LinkTarget object that the link is broken the next time the LinkTarget object calls the LinkSource object.

Similarly, an interface may be provided that allows the user to select and break the link to a particular LinkTarget object. The interface begins by invoking the "RemoveLink" method of the LinkTarget object. The LinkTarget object, in turn, calls via the Availability Server the LinkSource object (or the LinkSourceSurrogate object) invoking the "RemoveLinkTarget" on the LinkSource object (or the LinkSourceSurrogate object) passing the LinkID as well as the connectionID. The LinkSource object (or the LinkSourceSurrogate object), upon receiving this call, deletes the entry in the table of targets corresponding to the supplied connectionID. The method invocations then return.

In addition, the LinkSource objects and LinkTarget objects may be treated as persistent content. This entails that Linksource objects and Linktarget objects can be part of a selection which is copied, either via the clipboard, via drag/drop, or via copying an entire document. When a copied selection includes both a LinkSource object and a LinkTarget object linked to the LinkSource object, the relationship is preserved when copied: that is, a LinkSource object A linked to a LinkTarget object B yields a new LinkSource object A' linked to a new LinkTarget object B'. However, if the selection includes only the Linktarget object and not the LinkSource object to which it is linked, then a copied Linktarget object is linked to the original Linksource object. However, if the selection includes only the LinkSource object and not ta LinkTarget object to which it is linked, then a copied Linksource object is not linked to the particular LinkTarget object.

In OpenDoc, parts which copy structured content (whether including links or not) do so using a "cloning" operation which structurally duplicates the inter-object storage unit (SU) references from the original content to the copied content. The present invention relies on this property whenever a locally linked LinkSource object-Linktarget object pair (i.e., within the same document) is copied.

According to the present invention, links are copied as follows. First, copies of LinkSource objects register with the Availability Server and obtain a new LinkID that replaces their older LinkID. And second, when a copy of a LinkTarget object is initialized and it is determined that the LinkTarget object is linked to a local LinkSource object, the Linktarget object calls the local LinkSource object and obtains the Availability Server name and LinkID associated with the local LinkSource object.

Figure 17:
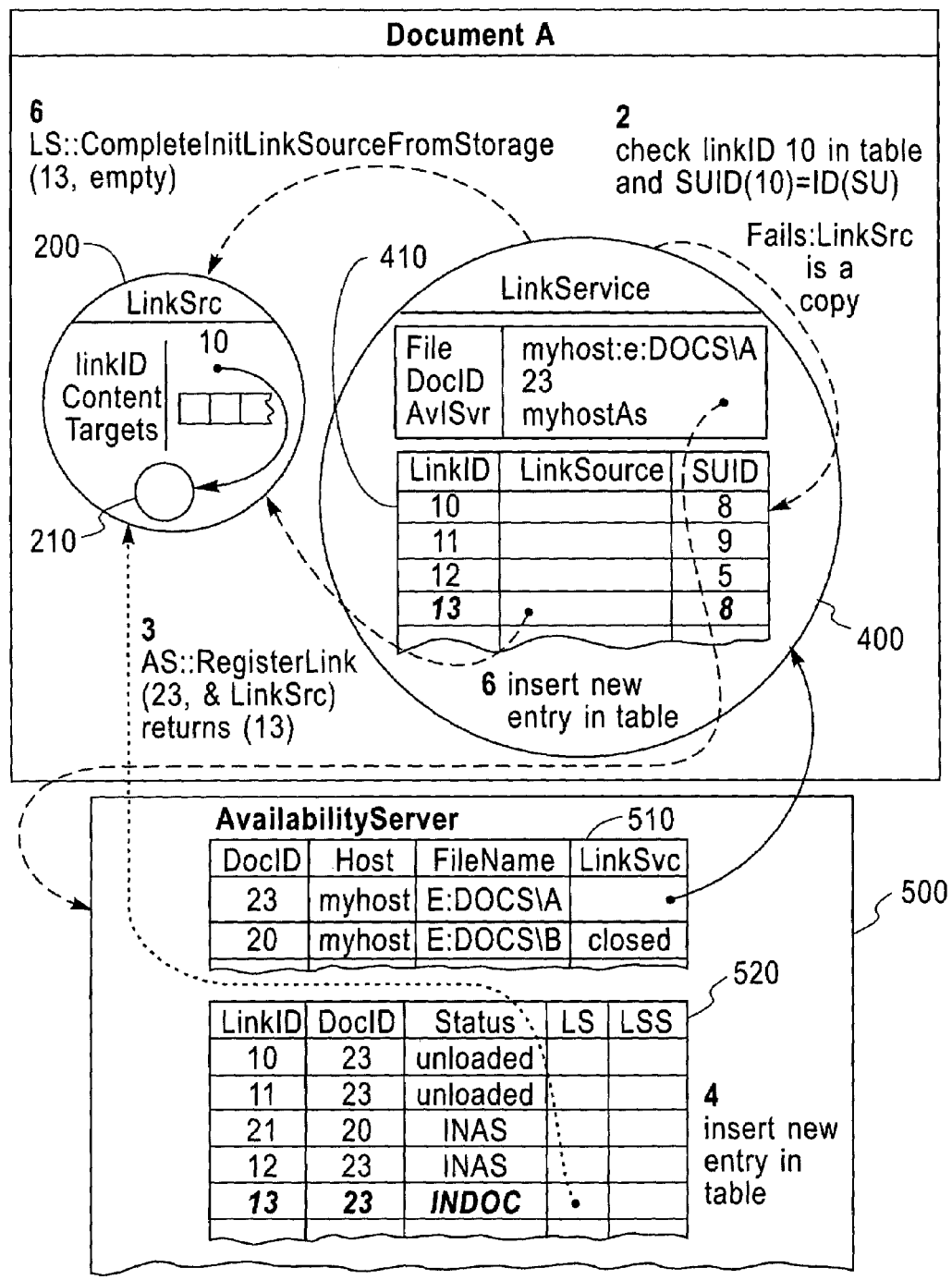

More specifically, copies of LinkSource objects are recognized by the LinkService object associated with the source part as copies when an existing document is opened and the parts of the document are re-created from their persistent representation. As described above, the LinkService object invokes the "InitLinkSourcefromStorage" method on the LinkSource object, which returns the LinkID associated with the LinkSource object. The LinkService object recognizes a particular LinkSource object is a copy when the LinkID returned by this method either is not in the table of LinkSource objects stored in the LinkService object, or is in the table of LinkSource objects 410 but refers to a different LinkSource object (e.g., one with a different storage unit identifier). As shown in FIG. 17 (Steps 2–6), the LinkService object does not invoke the "LinkOpen" method on the Availability Server as discussed above, instead it invokes the "RegisterLinkSource" method on the Availability Server, passing the DocumentID and a pointer to the LinkSource object. In the "RegisterLinkSource" method, the Availability Server generates a new LinkID (unique to the Availability Server), and associates the LinkID with the DocumentID. The pair <Availability Server Name, LinkID> henceforth serves as a persistent reference to the copied LinkSource object. The RegisterLinkSource method (step 4) then writes the DocumentID, the LinkID, and a pointer to the copied Linksource object as an entry in the table of Linksource objects stored in the Availability Server, sets the status field of the entry as "INDOC", and initializes the auxiliary state of the LinkSource object to empty. The Availability Server then returns (return from step 3) the newly generated LinkID to the LinkService object. The LinkService object, in turn, invokes the "CompleteInitLinkSourcefromStorage" method on the LinkSource object, passing the linkID and an empty auxiliary state, and also adds an entry to its table of LinkSource objects 410 that includes the link ID and the storage unit identifier of the LinkSource object. In the "CompleteInitLinkSourcefromStorage" method, the LinkSource object checks whether the LinkSource object is a copy which is indicated by the LinkID supplied by the LinkService object being different from the LinkID previously stored. If the LinkSource object determines it is a copy, the LinkSource object ignores the auxiliary state previously stored and initializes as empty the table of link targets within the LinkSource object.

LinkTarget objects are detected as copies by the LinkService object 200 using a similar mechanism. When a copied Linktarget object is initialized from storage, the LinkTarget object checks whether the storage unit identifier of LinkSource objects to which it is linked are local (in the same document). If so, the Linktarget object invokes the "GetPersistentInfo" method on the LinkSource object, which returns a new Availability name and linkID pair. Additionally, a copied Linktarget object always invokes the "AddNewTarget" method on the LinkSource object, which if the tracking mechanism is in the second mode allows the LinkSource object to record a new entry in the table of LinkTargets stored therein that includes the location and description of the Linktarget object.

The pointers to the objects discussed above are preferably persistent Bento references. A more detailed description of a Bento reference may be found in the Bento Specification, available at http://www.cil.org/pub/cilabs/tech/bento/Bento-Specification/postscript, herein incorporated by reference in its entirety.

The present invention as described above is embodied as part of an OpenDoc application layer that includes one or more parts, wherein communication among the computer systems occurs between objects that comply with the CORBA standards mentioned above. Moreover, the computer systems of the present invention as described above preferably included a CORBA compliant high-level object communication protocol layer, for example IBM's SOM, and a TCP/IP compliant low-level communication protocol layer, for example IBM's TCP/IP Version 2.0. However, the present invention is not limited in this respect and may be embodied in any distributed data processing system, including telephone systems, cable and wireless television systems, cable and wireless digital audio systems, distributed video systems, and other distributed information systems. For example, the present invention may be embodied in a real-time information delivery system wherein the information source periodically becomes unavailable (for example, by shutting down, or by going idle), and the state of the information source when unavailable is saved. The Availability Server of the present invention may be used to provide access to information source or the saved state, depending upon whether the information source is up and running or unavailable.

As described above, the Availability Server of the present invention preferably resides on the same computer system as the information source, stores a pointer to content provided by the information source, and provides access to the content regardless of whether the information source is available or unavailable. However, the invention is not limited in this respect. For example, in some applications, it may be preferred that the Availability Server reside on a separate computer system from the information source. In this case, the Availability Server may store the entire state of the information source when the information source becomes unavailable, and provide access to the stored state when the information source is unavailable.

Moreover, the objects as described above are objects created with an object oriented programming system, for example IBM's Visual Age C++. However, the present invention is not limited in this respect. Generally, the objects may be discrete functional components of applications whose state can be saved and retrieved independent of one another.

While the invention has been shown and described with reference to particular embodiments thereof, it will be understood by those skilled in the art that the foregoing and other changes in form and detail may be made therein without departing from the spirit and scope of the invention.

We claim:

1. In a network comprising a first node, a second node and an computer implemented server located at a node separate from the first and second nodes, an availability server method for communicating information between a linking application in the first node and an object of a linked application in the second node, wherein the linked application is in one of an executing state and a non-executing state, wherein state data indicate the object is in one of a loaded state and an unloaded state, the computer implemented method comprising the steps of:

receiving a message from the linking application addressed to the object;

in response to receiving the message, determining whether the linked application is in the executing or non-executing state;

upon determining that the linked application is in the executing state, forwarding the message to the object for processing the message and responding to the linking application accordingly;

upon determining that the linked application is in the non-executing state, accessing a surrogate object, and forwarding the message to the surrogate object, wherein the surrogate object comprises first data and second data and wherein the first data defines the state of the object that cannot be changed when the linked application is in the non-executing state and the second data defines the state of the object which can be changed when the linked application is in the non-executing;

wherein the object is initialized utilizing the updated first data by: determining whether the surrogate object associated with the object is in one of the loaded state and the unloaded state; if the surrogate object is in the unloaded state, transferring the first and second data to the linked application; and if the surrogate object cannot be unloaded, transferring only the first data to the linked application.

2. The method of claim 1, further comprising:

determining whether the surrogate object is in a loaded or unloaded state;

upon determining that the linked application is in the non-executing state and the surrogate object is in the loaded state, forwarding the message to the surrogate object for processing the message and responding to the linking application accordingly;

upon determining that the linked application is in the non-executing state and the surrogate object is in the unloaded state, loading the surrogate object and forwarding the message to the surrogate object for processing the message and responding to the linking application accordingly.

3. The method of claim 1, further comprising the steps of:

upon determining that the linked application is in the executing state and the object is in the unloaded state, controlling the linked application to load and initialize the object and forwarding the message to the object; and wherein the object, upon receiving the message, processes the message and responds to the linking application accordingly.

4. The method of claim 1, further comprising updating the second data accordingly upon request from the linked application.

5. The method of claim 1, further comprising:

upon detecting that the linked application is changing from the executing state to the non-executing state, supplying to the availability server the first and second data associated with the object in the linked application, wherein the availability server stores the first and second data; and upon detecting that the linked application is changing from the non-executing state to the executing state, communicating the updated first data to the object.

6. The method of claim 1, wherein the object initialization further comprising:

updating the state data to indicate the object is in a loaded state, when the object changes from the unloaded state to the loaded state;

upon determining that the surrogate object is in the loaded state, determining whether the surrogate object can be unloaded.

7. The method of claim 1, further comprising the steps of:

when the object changes from the unloaded state to the loaded state, updating the state data to indicate the object is in a loaded state;

determining whether the surrogate object associated with the object is in one of the loaded and the unloaded state;

upon determining that the surrogate object is in the loaded state, determining whether the surrogate object can be unloaded;

if the surrogate object can be unloaded, unloading the surrogate object and updating the state data to indicate that the surrogate object is in the unloaded state;

if the surrogate object cannot be unloaded, updating the state 11 data to indicate that the surrogate object is in the loaded state.

8. The method of claim 1, further comprising the steps of:

when the linked application is executing and the surrogate object is in a loaded state, monitoring messages intended for the object until detecting that the surrogate object can be unloaded; and upon detecting that the surrogate object can be unloaded, transferring the second data state of the surrogate object to the linked application and unloading the surrogate object and destroying the surrogate object.

9. The method of claim 1, wherein the linking application comprises a document containing a link target object and the linked application comprises a document, wherein the object is a link source object that is associated with a content object for storing content, and wherein the message is sent from the link target object to the availability server and intended for the link source object.

10. The method of claim 9, wherein the message is one of the following:

i] a request that the link source object supply a change identifier that is updated when the content stored in the content object is updated;

ii] a request for a lock on the content object associated with the link source object;

iii] a request that the link source object supply a pointer to the content object;

iv] a request to unlock the content object associated with the link source object;

v] a request to register with the link source object such that the link target object is notified if the content stored in the content object is updated;

vi] a request to un-register with the link source object such that the link target object is no longer notified if the content stored in the content object is updated; and vii] a request that the link source object send to the link target object information related to the link source object.

11. The method of claim 9, wherein the link target object utilizes a link identifier that uniquely identifies the link source object within a set of link source objects, and wherein the availability server routes the message to one of:

the link source object within the set of link source objects as determined by the link identifier, and the surrogate object corresponding to the link source object within the set of link source objects as determined by the link identifier.

12. In a network comprising a first node, a second node and an application server located at a node separate from the first and second nodes, a computer-readable medium comprising computer implemented instructions for communicating information between a linking application in the first node and an object in a linked application in the second node, wherein the linked application is in one of an executing state and a non-executing state, wherein state data indicate the object is in one of a loaded state and an unloaded state, the computer implemented instructions comprising:

receiving a message from the linking application addressed to the object;

in response to receiving the message, determining whether the linked application is in the executing or non-executing state;

upon determining that the linked application is in the executing state, forwarding the message to the object for processing the message and responding to the linking application accordingly;

upon determining that the linked application is in the non-executing state, accessing a surrogate object, and forwarding the message to the surrogate object, wherein the surrogate object comprises first data and second data and wherein the first data defines the state of the object that cannot be changed when the linked application is in the non-executing state and the second data defines the state of the object which can be changed when the linked application is in the non-executing state;

wherein the object is initialized utilizing the updated first data by: determining whether the surrogate object associated with the object is in one of the loaded state and the unloaded state; if the surrogate object is in the unloaded state, transferring the first and second data to the linked application; and if the surrogate object cannot be unloaded, transferring only the first data to the linked application.

13. The computer-readable medium of claim 12 further comprising:

determining whether the surrogate object is in a loaded or unloaded state;

upon determining that the linked application is in the non-executing state and the surrogate object is in the loaded state, forwarding the message to the surrogate object for processing the message and responding to the linking application accordingly;

determining whether the surrogate object is in a loaded or unloaded state; and upon determining that the linked application is in the non-executing state and the surrogate object is in the unloaded state, loading the surrogate object and forwarding the message to the surrogate object for processing the message and responding to the linking application accordingly.

14. The computer-readable medium of claim 12 further comprising:

upon determining that the linked application is in the executing state and the object is in the unloaded state, controlling the linked application to load and initialize the object and forwarding the message to the object; and wherein the object, upon receiving the message, processes the message and responds to the linking application accordingly.

15. The computer-readable medium of claim 12, wherein the object initialization further comprising:

updating the state data to indicate the object is in a loaded state, when the object changes from the unloaded state to the loaded state;

upon determining that the surrogate object is in the loaded state, determining whether the surrogate object can be unloaded.

* * * * *